United States Patent
Masamoto et al.

(10) Patent No.: US 10,768,705 B2
(45) Date of Patent: Sep. 8, 2020

(54) INPUT DEVICE

(71) Applicant: PANASONIC INTELLECTUAL PROPERTY MANAGEMENT CO., LTD., Osaka (JP)

(72) Inventors: Kai Masamoto, Osaka (JP); Hiroyuki Togawa, Osaka (JP); Sho Sonoda, Osaka (JP); Shogo Maenaka, Osaka (JP); Masaki Kitahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 44 days.

(21) Appl. No.: 16/249,260

(22) Filed: Jan. 16, 2019

(65) Prior Publication Data
US 2019/0227630 A1    Jul. 25, 2019

(30) Foreign Application Priority Data

| Jan. 19, 2018 | (JP) | 2018-007322 |
| Feb. 6, 2018 | (JP) | 2018-019392 |
| Feb. 28, 2018 | (JP) | 2018-035903 |
| Sep. 25, 2018 | (JP) | 2018-179072 |

(51) Int. Cl.
| G06F 3/01 | (2006.01) |
| G06F 3/044 | (2006.01) |
| G06F 3/0354 | (2013.01) |
| G06F 3/041 | (2006.01) |
| B60K 35/00 | (2006.01) |

(52) U.S. Cl.
CPC ............. *G06F 3/016* (2013.01); *B60K 35/00* (2013.01); *G06F 3/03547* (2013.01); *G06F 3/044* (2013.01); *G06F 3/0416* (2013.01); *G06F 2203/04104* (2013.01); *G06F 2203/04105* (2013.01)

(58) Field of Classification Search
CPC ...... G06F 3/044; G06F 3/03547; G06F 3/016; G06F 3/0416; B60K 35/00
See application file for complete search history.

(56) References Cited

U.S. PATENT DOCUMENTS

| 7,671,846 | B1 | 3/2010 | Komata |
| 2011/0141052 | A1 | 6/2011 | Bernstein et al. |
| 2012/0032801 | A1* | 2/2012 | Ujii ................. G06F 3/016 340/540 |

(Continued)

FOREIGN PATENT DOCUMENTS

| JP | 2003-519863 A | 6/2003 |
| JP | 2013-513865 A | 4/2013 |

(Continued)

*Primary Examiner* — Shaheda A Abdin
(74) *Attorney, Agent, or Firm* — Greenblum & Bernstein, P.L.C.

(57) ABSTRACT

A main body includes an input component that receives a load. A pressure-sensitive sensor detects the load received by the input component. A drive unit performs a predetermined operation. A drive controller activates the drive unit when the load detected by the pressure-sensitive sensor reaches a predetermined load threshold. A detection controller changes the predetermined load threshold in accordance with the rate of change in the load detected by the pressure-sensitive sensor.

13 Claims, 18 Drawing Sheets

(56) References Cited

U.S. PATENT DOCUMENTS

2014/0043547 A1* 2/2014 Marhefka ............... G06F 3/046
                                                          349/12
2014/0104207 A1* 4/2014 Park ....................... G06F 3/016
                                                         345/173
2017/0336891 A1* 11/2017 Rosenberg .............. G06F 3/045

FOREIGN PATENT DOCUMENTS

| JP | 2013-109603 | A  | 6/2013 |
| JP | 2016-120890 | A  | 7/2016 |
| WO | 01/52037    | A2 | 7/2001 |
| WO | 2011/071837 | A2 | 6/2011 |

* cited by examiner

INPUT DEVICE

CROSS REFERENCE TO RELATED APPLICATION

The present application is based on and claims priority of Japanese Patent Application No. 2018-007322 filed on Jan. 19, 2018, Japanese Patent Application No. 2018-019392 filed on Feb. 6, 2018, Japanese Patent Application No. 2018-035903 filed on Feb. 28, 2018, and Japanese Patent Application No. 2018-179072 filed on Sep. 25, 2018.

BACKGROUND

1. Technical Field

The present disclosure relates to input devices.

2. Description of the Related Art

Conventionally, an input device that operates in response to an input from a user is known. For example, Japanese Unexamined Patent Application Publication (Translation of PCT Application) No. 2003-519863 discloses a pressure-sensitive controller that outputs, as a pressure value, a pressing force resulting from a user applying pressure to an operator connected to a pressure element.

SUMMARY

The input device according to Japanese Unexamined Patent Application Publication (Translation of PCT Application) No. 2003-519863 can be improved upon.

In view of this, the present disclosure provides an input device capable of improving upon the above related art.

An input device according to one aspect of the present disclosure includes: a main body including an input component that receives a load by being pressed; a pressure-sensitive sensor that detects the load received by the input component; a drive unit configured to perform a predetermined operation; and a controller including a drive controller and a detection controller, the drive controller activating the drive unit when the load detected by the pressure-sensitive sensor reaches a predetermined load threshold, and the detection controller changing the predetermined load threshold in accordance with a rate of change in the load detected by the pressure-sensitive sensor.

An input device according to another aspect of the present disclosure includes: an electrostatic capacitive touch sensor configured to detect a surface area of contact with at least an object used to perform an input; a pressure-sensitive sensor that is mechanically coupled to the electrostatic capacitive touch sensor and detects a load applied to the electrostatic capacitive touch sensor; and a controller that is electrically connected to the electrostatic capacitive touch sensor and the pressure-sensitive sensor. The controller: calculates pressure applied to the electrostatic capacitive touch sensor by dividing the load output from the pressure-sensitive sensor by the surface area output from the electrostatic capacitive touch sensor; determines a load state, including whether a press input is being performed or not, of the electrostatic capacitive touch sensor by comparing the pressure with a predetermined pressure threshold; and provides haptic feedback to the object in accordance with the load state.

An input device according to yet another aspect of the present disclosure is electrically connected to an external device and includes: a touch pad including an input surface, the touch pad being configured to receive a touch input via contact between the input surface and an object; and a controller electrically connected to the touch pad. The controller: obtains, based on a detection value from the touch pad, a contact quantity related to contact between the touch pad and the object, and a coordinate change quantity indicating an amount of movement of the object on the input surface of the touch pad resulting from the touch input; and calculates an operation value for operating the external device based on the contact quantity and the coordinate change quantity. The contact quantity indicates one of (i) a magnitude of a surface area of contact between the touch pad and the object and (ii) a total number of contacts between the touch pad and the object.

The input device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
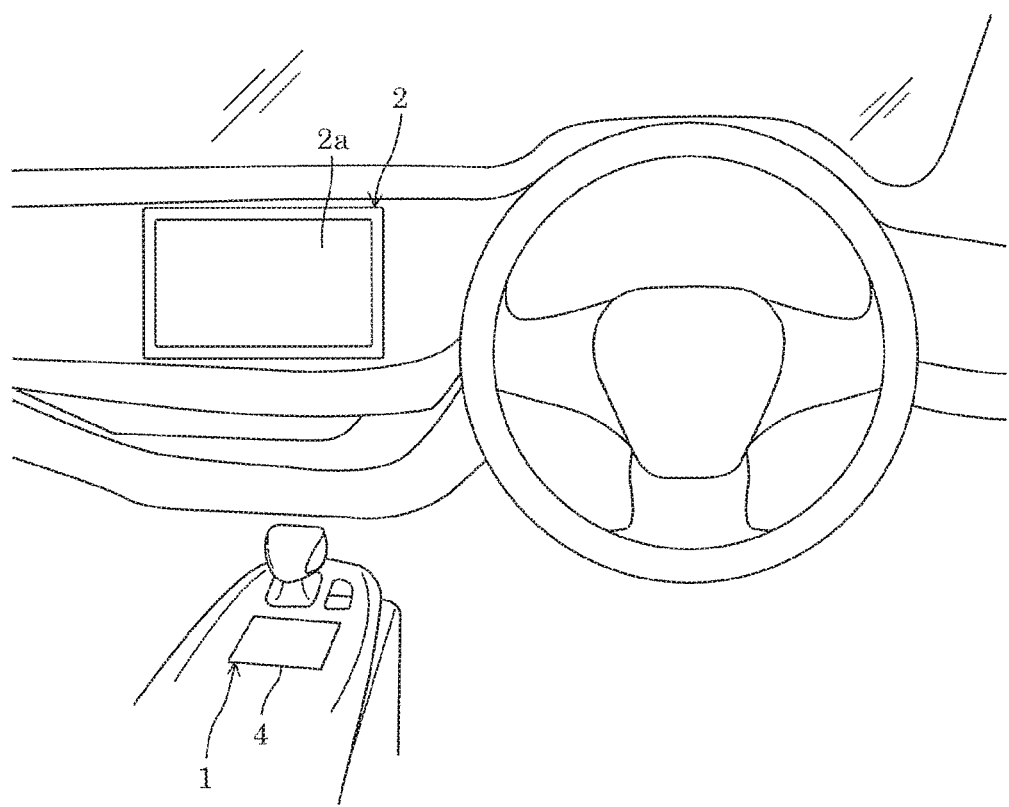
FIG. 1 is a perspective view illustrating each component of an input device and a display device according to an embodiment, installed in the interior of an automobile.

DETAILED DESCRIPTION OF THE EMBODIMENTS (Underlying Knowledge Forming Basis of the Present Disclosure)

The inventors found the following problems with the input device described in the "Description of the Related Art" section.

The input device according to Japanese Unexamined Patent Application Publication (Translation of PCT Application) No. 2003-519863 receives an input as a result of the user pressing or releasing the input component of the input device, and begins operating in accordance with the input.

However, each time an input is performed on the input component by the user (i.e., an input of pressing the input component or an input of releasing the input component), in cases in which the load changes during the time lag (delay time) ending when the input device starts performing operations in accordance with the input, it is difficult for the input device to start the operations in accordance with the input at a constant load. As a result, there are inconsistencies in how it feels to operate the input device.

In order to overcome such a problem, an input device according to one aspect of the present disclosure includes: a main body including an input component that receives a load by being pressed; a pressure-sensitive sensor that detects the load received by the input component; a drive unit configured to perform a predetermined operation; and a controller including a drive controller and a detection controller, the drive controller activating the drive unit when the load detected by the pressure-sensitive sensor reaches a predetermined load threshold, and the detection controller changing the predetermined load threshold in accordance with a rate of change in the load detected by the pressure-sensitive sensor.

Moreover, the drive unit may be configured to vibrate the input component in response to control by the drive controller.

Moreover, the predetermined load threshold may be a predetermined press threshold for a press input defined by a gradual increase in the load received by the input component, the drive controller may activate the drive unit when the load detected by the pressure-sensitive sensor during the press input gradually increases and reaches the predetermined press threshold, and the detection controller may change the predetermined press threshold in accordance with the rate of change in the load detected by the pressure-sensitive sensor during the press input, the rate of change during the press input being a press velocity.

Moreover, the detection controller may set the predetermined press threshold to a first press threshold when the press velocity does not exceed a predetermined press velocity threshold during the press input, and set the predetermined press threshold to a second press threshold lower than the first press threshold when the press velocity exceeds the predetermined press velocity threshold during the press input.

Moreover, the predetermined press velocity threshold may be set based on a plurality of press velocities, each being the press velocity, obtained by a user performing the press input a plurality of times.

Moreover, the drive controller may change, in accordance with the press velocity, at least one of an amplitude, a frequency, and a duration of a vibration applied to the input component by the drive unit.

Moreover, the input component may move in a direction in which the load is applied, in accordance with an increase in the load, the main body may include a stopper that contacts the input component to restrict movement of the input component in the direction, when the load detected by the pressure-sensitive sensor during the press input reaches a predetermined maximum load, the drive controller may change, among an amplitude, a frequency, and a duration of the vibration applied to the input component by the drive unit, at least the amplitude, and the predetermined maximum load may be set to a value greater than a value of the load at contact between the input component and the stopper during the press input.

Moreover, when the press input is repeated two or more times consecutively, the detection controller may set the predetermined press threshold for second and subsequent instances of the press input lower than the predetermined press threshold set for a first instance of the press input.

Moreover, the predetermined load threshold may be a predetermined release threshold for a release input defined by a gradual decrease in the load received by the input component, the drive controller may activate the drive unit when the load detected by the pressure-sensitive sensor during the release input gradually decreases and reaches the predetermined release threshold, and the detection controller may change the predetermined release threshold in accordance with the rate of change in the load detected by the pressure-sensitive sensor during the release input, the rate of change during the release input being a release velocity.

Moreover, the detection controller may set the predetermined release threshold to a first release threshold when the release velocity does not exceed a predetermined release velocity threshold during the release input, and set the predetermined release threshold to a second release threshold higher than the first release threshold when the release velocity exceeds the predetermined release velocity threshold during the release input.

Moreover, the predetermined release velocity threshold may be set based on a plurality of release velocities, each being the release velocity, obtained by the user performing the release input a plurality of times.

Moreover, the drive controller may change, in accordance with the release velocity, at least one of an amplitude, a frequency, and a duration of a vibration applied to the input component by the drive unit.

Another example of a conventionally known input device for making inputs on an on-board device in, for example, an automobile, is disclosed in Japanese Unexamined Patent Application Publication No. 2016-120890.

Japanese Unexamined Patent Application Publication No. 2016-120890 discloses a switch device including a touch sensor whose electrostatic capacitance changes based on a touch input made on a touch region, a pressure-sensitive sensor that detects a pressing force applied to the touch region, and a vibration generator that vibrates the touch region. The switch device further includes a vibration feedback controller electrically connected to the touch sensor, the pressure-sensitive sensor, and the vibration generator. The vibration feedback controller determines an input to be a touch input when it determines the amount of change in voltage generated by the pressure-sensitive sensor after detection of a change in the electrostatic capacitance by the electrostatic capacitive touch sensor to be greater than or equal to a press threshold, and generates vibration feedback by driving the vibration generator.

With the switch device disclosed by Japanese Unexamined Patent Application Publication No. 2016-120890, the surface area of contact (i.e., contact area) between an object such as the finger or palm of the hand of the user and the touch panel is not taken into consideration when the vibration feedback controller applies vibration feedback to the object when the amount of change in voltage generated by the pressure-sensitive sensor is greater than or equal to the press threshold. Accordingly, since there is a difference between the contact area with the touch panel when, for example, the user touches and makes a press input (hereinafter simply referred to as making a press input) with his or her finger, and when the user makes a press input with the palm of his or her hand, there is a proportional difference in the strength of how it feels to make an input via vibration feedback between an input made with a finger and an input made with the palm of the hand. In other words, the switch device disclosed by Japanese Unexamined Patent Application Publication No. 2016-120890 has a problem that the feeling of operating the device through the object is inevitably different depending on the magnitude of the contact area.

In view of this, the inventors arrived at the following input device for making how it feels to make a press input using the object consistent.

The input device may further include: an electrostatic capacitive touch sensor configured to detect a surface area of contact with at least an object used to perform an input. The controller may: calculate pressure applied to the electrostatic capacitive touch sensor by dividing the load output from the pressure-sensitive sensor by the surface area output from the electrostatic capacitive touch sensor; determine a load state, including whether a press input is being performed or not, of the electrostatic capacitive touch sensor by comparing the pressure with a predetermined pressure threshold; and provided haptic feedback to the object according to the load state.

Moreover, the drive unit may be configured to generate the haptic feedback to be applied to the object by vibrating the electrostatic capacitive touch sensor, and the controller may calculate a vibration strength for the drive unit based on the surface area.

Moreover, the controller may calculate the vibration strength to increase with an increase in the surface area.

Moreover, the controller may: include storage that stores a reference vibration strength for the drive unit and a plurality of coefficients corresponding to different magnitudes of the surface area; and calculate the vibration strength for the surface area output by the electrostatic capacitive touch sensor based on a mathematical product of the reference vibration strength and a coefficient in the plurality of coefficients that corresponds to the surface area output by the electrostatic capacitive touch sensor.

Moreover, the controller may be configured to arbitrarily set the reference vibration strength.

Yet another example of a conventionally known input device capable of receiving a touch input for operating, for example, a external device is disclosed in Japanese Unexamined Patent Application Publication No. 2013-109603.

Japanese Unexamined Patent Application Publication No. 2013-109603 discloses an input device capable of receiving an input for moving a cursor on a display screen of a display device (external device). The input device includes a touch pad capable of receiving a touch input, and a plurality of pressure sensors that are disposed around an outside region of the touch pad and capable of detecting the pressing force imparted by a finger of the user.

However, the diversification and multi-functionality in recent years of display devices equipped in the interior of automobiles, for example, has led to an increase in the size of the display screen of such display devices. Therefore, with a conventional input device such as the one disclosed in Japanese Unexamined Patent Application Publication No. 2013-109603, since the region of the touch pad in which an input is made is relatively small, there is a problem that the user must make multiple touch inputs in order to move the cursor on the display screen of the display device to the destination position.

In order to overcome the above problem, the input device disclosed in Japanese Unexamined Patent Application Publication No. 2013-109603 is configured to allow the user to continue moving the cursor even if the user's finger leaves the region of the touch pad when making a touch input, by detecting the pressing force of the user's finger with the plurality of pressure sensors.

However, with the input device disclosed in Japanese Unexamined Patent Application Publication No. 2013-109603, in addition to a touch pad, a plurality of pressure sensors need to be provided, resulting in a problem that the overall configuration becomes complicated. Moreover, when the user's finger goes outside the region of the touch pad when making a touch input, the user must make an input different from the touch input in order to continue moving the cursor (i.e., must press the pressure sensor with his or her finger), resulting in an inconsistency in how it feels to make an input. In this way, with the input device disclosed in Japanese Unexamined Patent Application Publication No. 2013-109603, it is difficult to continuously move the cursor from beginning to end with an intuitive input (touch input).

Thus, the inventors arrived at the following input device that allows for a user to complete an intuitive input for operating an external device, with a simple configuration, thereby making how it feels to make an input consistent.

The input device may further include a touch pad including an input surface, the touch pad being configured to receive a touch input via contact between the input surface and an object. The controller may: obtain, based on a detection value from the touch pad, a contact quantity related to contact between the touch pad and the object, and a coordinate change quantity indicating an amount of movement of the object on the input surface of the touch pad resulting from the touch input; and calculate an operation value for operating an external device electrically connected to the input device, based on the contact quantity and the coordinate change quantity. The contact quantity may indicate one of (i) a magnitude of a surface area of contact between the touch pad and the object and (ii) a total number of contacts between the touch pad and the object.

Moreover, the controller may reduce the operation value as the surface area increases.

Moreover, the controller may reduce the operation value as the surface area decreases.

Moreover, the controller may change the operation value in accordance with increases and decreases in the surface area while there is continuous contact between the touch pad and the object.

Moreover, the controller may, when the object is moving, determine the operation value based on the coordinate change quantity and the surface area at initial contact between the object and the touch pad, and continuously output the operation value determined to the external device until the object is removed from the touch pad.

Moreover, the drive unit may be electrically connected to the controller and configured to vibrate the touch pad when mechanically coupled to the touch pad, and while the drive unit is being driven, the controller may prohibit changing of the operation value to prevent the operation value from varying from increases and decreases in the surface area.

Moreover, the controller may prohibit changing of the operation value to prevent the operation value from varying both during a first deactivation period before the drive unit is driven and a second deactivation period after driving of the drive unit is completed.

Moreover, the first deactivation period may be set shorter than the second deactivation period.

Moreover, the controller may determine the operation value before the drive unit is driven and continuously output the determined operation value to the external device until the object is removed from the touch pad.

Moreover, the external device may be a display device that displays a display screen including a cursor that is movable, the operation value may determine a distance of travel of the cursor on the display screen, and the controller may output the operation value to the display device.

An input device according to another aspect of the present disclosure includes: an electrostatic capacitive touch sensor configured to detect a surface area of contact with at least an object used to perform an input; a pressure-sensitive sensor that is mechanically coupled to the electrostatic capacitive touch sensor and detects a load applied to the electrostatic capacitive touch sensor; and a controller that is electrically connected to the electrostatic capacitive touch sensor and the pressure-sensitive sensor. The controller: calculates pressure applied to the electrostatic capacitive touch sensor by dividing the load output from the pressure-sensitive sensor by the surface area output from the electrostatic capacitive touch sensor; determines a load state, including whether a press input is being performed or not, of the electrostatic capacitive touch sensor by comparing the pressure with a predetermined pressure threshold; and provides haptic feedback to the object in accordance with the load state.

An input device according to yet another aspect of the present disclosure is electrically connected to an external device and includes: a touch pad including an input surface, the touch pad being configured to receive a touch input via contact between the input surface and an object; and a controller electrically connected to the touch pad. The controller: obtains, based on a detection value from the touch pad, a contact quantity related to contact between the touch pad and the object, and a coordinate change quantity indicating an amount of movement of the object on the input surface of the touch pad resulting from the touch input; and calculates an operation value for operating the external device based on the contact quantity and the coordinate change quantity. The contact quantity indicates one of (i) a magnitude of a surface area of contact between the touch pad and the object and (ii) a total number of contacts between the touch pad and the object.

Hereinafter, embodiments will be described in detail with reference to the drawings. Note that like elements share like reference signs in the drawings. Accordingly, repeated description will be omitted.

Embodiment 1

FIG. 1 illustrates a schematic configuration of the interior of an automobile. As illustrated in FIG. 1, input device 1 is provided on the center console in the interior of the automobile. Display device 2 (which is an external device), which is electrically connected to input device 1, is also provided on the center console in the interior of the automobile.

Display device 2 is, for example, a liquid crystal display or an organic electroluminescent (EL) display.

For example, input device 1 is provided on the center console of an automobile, and receives inputs for on-board devices, such as a navigation system, an audio player, and/or an air conditioner. For example, display device 2 displays a user interface for receiving inputs for on-board devices, such as a navigation system, an audio player, and/r an air conditioner.

Figure 2:
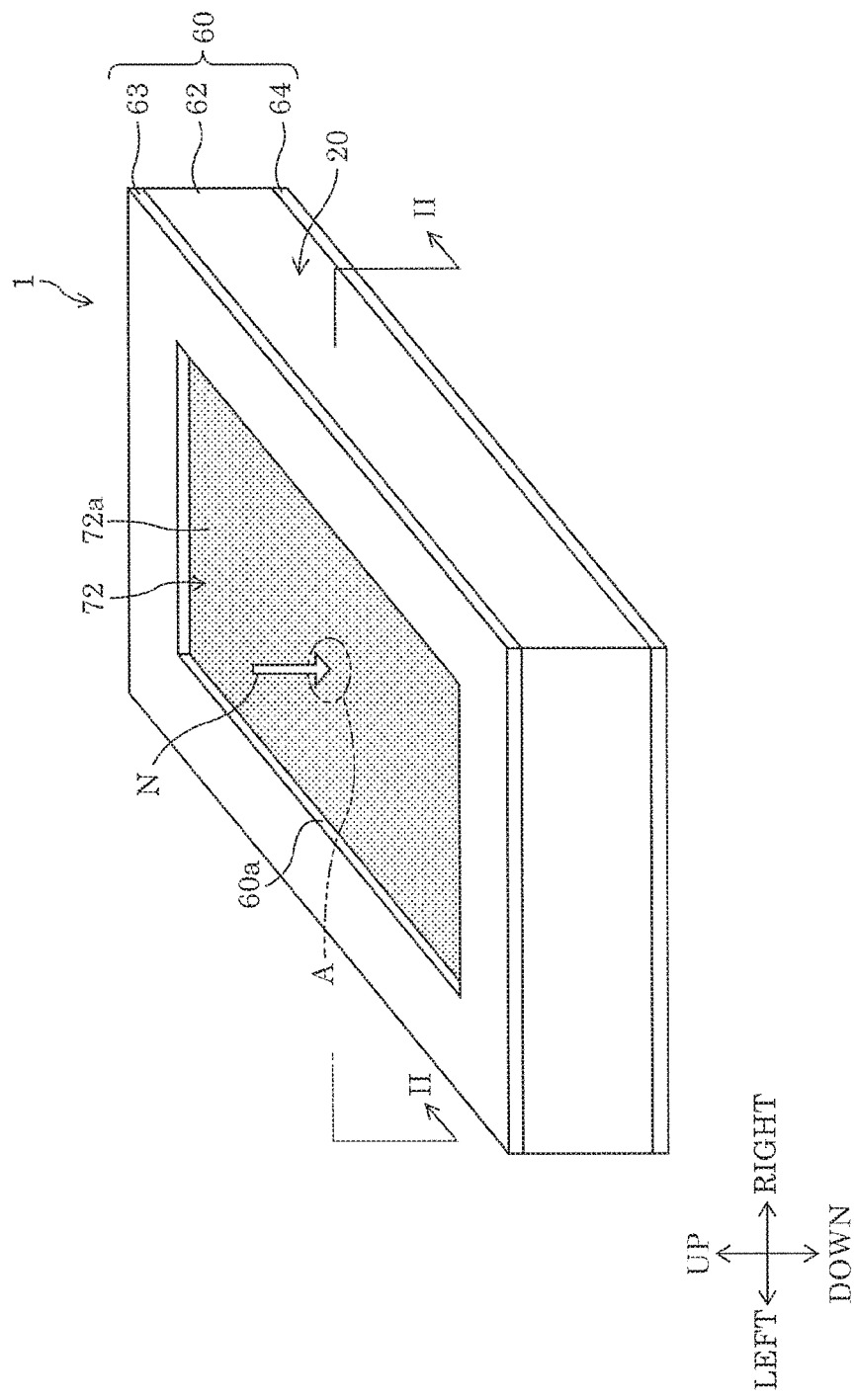
FIG. 2 is a perspective view of the outer appearance of the input device according to Embodiment 1.
Figure 3:
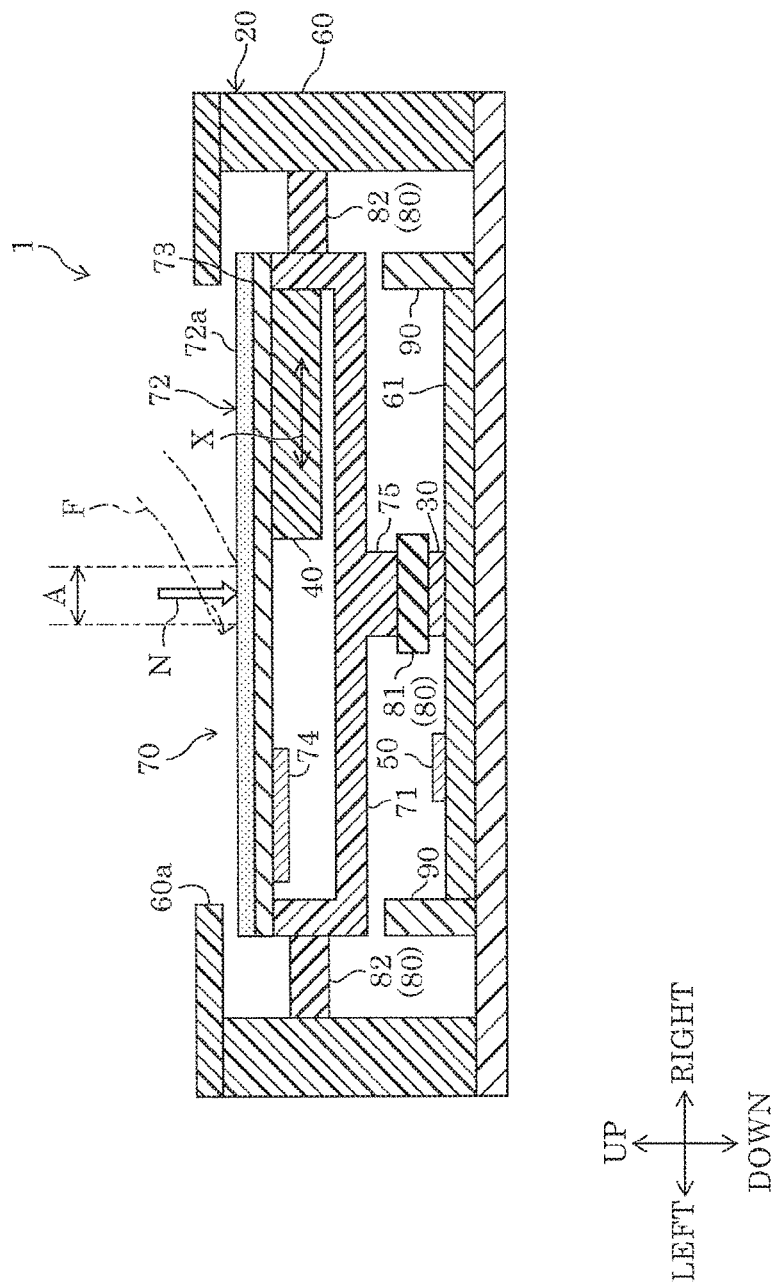
FIG. 3 is a cross-sectional view illustrating an example of the structure of the input device according to Embodiment 1.

FIG. 2 and FIG. 3 illustrate examples of the outer appearance and structure of input device 1 according to Embodiment 1. Input device 1 includes main body 20, pressure-sensitive sensor 30, drive unit 40, and controller 50.

(Main Body)

Main body 20 includes enclosure 60, input component 70, support mechanism 80, and stopper 90. Input component 70, support mechanism 80, and stopper 90 are housed inside enclosure 60. Note that stopper 90 need not be disposed inside enclosure 60.

Hereinafter, for convenience, the direction in which input component 70 moves when pressed via an object is referred to as "down", "downward", and the like, and the direction in which input component 70 moves when released via the object is referred to as "up", "upward", and the like, and directions perpendicular to the up and down directions are referred to as "horizontal" directions. Note that the "object" is, for example, a finger or the palm of the hand of the user. Moreover, the "top" of input device 1 is defined as the side on which touch sensor 73 is offset in main body 20, and the "bottom" of input device 1 is defined as the opposite side. Note that the directions indicated by the up, down, left, and right arrows illustrated in FIG. 2 and FIG. 3 are not related to the up, down, left, and right directions when input device 1 is in an installation position in the automobile.

(Enclosure)

Enclosure 60 has a hollow cuboid shape and defines opening 60a on one surface. More specifically, enclosure 60 includes tubular section 62, top cover 63, and bottom cover 64.

Tubular section 62 has a substantially rectangular tubular shape in a plan view, and defines the sides of main body 20.

Top cover 63 has the approximate shape of a plate, and is disposed to cover the top of tubular section 62. In a plan view, top cover 63 has the shape of a four-sided frame disposed along the perimeter of tubular section 62. Stated differently, top cover 63 defines the substantially rectangular opening 60a that opens upward and downward in a plan view.

Bottom cover 64 has the approximate shape of a plate, and is disposed to cover the bottom of tubular section 62. In this embodiment, bottom cover 64 is removably coupled to tubular section 62. Main substrate 61 is attached to the top side of bottom cover 64. Stated differently, main substrate 61 is housed inside enclosure 60. Main substrate 61 is disposed on the base of enclosure 60. Pressure-sensitive sensor 30 and controller 50 are provided on main substrate 61.

(Input Component)

Input component 70 is movably housed in enclosure 60, and is partially exposed via opening 60a in enclosure 60. The portion of input component 70 exposed via opening 60a is pressed using object F by the user. A load (load N) is placed on input component 70 as a result of input component 70 being pressed. In this embodiment, input component 70 is configured to freely move in the direction in which the load is applied (downward in FIG. 3) in accordance with an increase in the load, and freely move in the direction opposite the direction in which load is applied (upward in FIG. 3) in accordance with a decrease in the load. More specifically, input component 70 includes movable component 71, input panel 72, touch sensor 73, and touch controller 74.

Movable component 71 has the shape of a cuboid box that defines an opening in the top surface thereof. The open top surface is disposed inside enclosure 60 and faces opening 60a of enclosure 60. Movable component 71 is movable in the up, down, left, and right (i.e., up, down, and horizontal directions) inside main body 20. Movable component 71 is disposed in main body 20 spaced apart from the sides of movable component 71 and the inner wall surface of tubular section 62.

Input panel 72 is for operating an on-board device, has the shape of a rectangular plate, and is disposed to cover the opening defined by the top surface of movable component 71. Input surface 72a located on the top surface of input panel 72 is exposed via opening 60a of top cover 63. Note that in FIG. 2 and FIG. 3, in order to accentuate the illustration of input panel 72, input panel 72 is shaded by dot hatching.

Touch sensor 73 has the shape of a rectangular plate and is disposed between movable component 71 and input panel 72. Touch sensor 73 is an electrostatic capacitive sensor. More specifically, touch sensor 73 is capable of detecting the position of object F contacting input surface 72a of input panel 72 and the surface area of contact (hereinafter referred to as contact area A) between input surface 72a and object F (see FIG. 2 and FIG. 3). Accordingly, as illustrated in FIG. 3, a press input made on input panel 72 is equivalent to a press input made on touch sensor 73.

Touch controller 74 is disposed below touch sensor 73, inside movable component 71. Touch controller 74 is electrically connected to touch sensor 73. Touch controller 74 outputs, to controller 50, information on the press input or information on the coordinates of the position of the touch and contact area A of the touch when a touch action is made.

Pressing component 75 protrudes from the base of movable component 71 toward the base of enclosure 60. Pressing component 75 is a component that, as a result of movable component 71 moving downward, presses down on (via damper 81 (to be described later)) pressure-sensitive sensor 30 disposed above main substrate 61. Stated differently, pressing component 75 is mechanically coupled to pressure-sensitive sensor 30 via damper 81.

(Support Mechanism)

Support mechanism 80 movably supports input component 70 in enclosure 60. In this example, support mechanism 80 includes damper 81 and elastic component 82.

Damper 81 is provided between input component 70 and the base of enclosure 60. More specifically, damper 81 is provided between pressing component 75 provided on the base of movable component 71 and pressure-sensitive sensor 30 provided on main substrate 61. Damper 81 is configured to absorb horizontal vibrations of input component 70. Damper 81 is, for example, a rubber component.

Elastic component 82 bridges input component 70 with the side wall of enclosure 60. More specifically, elastic component 82 is disposed between the side wall of movable component 71 and the side wall of enclosure 60. Elastic component 82 is configured to expand and contract horizontally when input component 70 vibrates horizontally. Elastic component 82 is, for example, a rubber component.

(Stopper)

Stopper 90 is provided in enclosure 60. Stopper 90 is configured to, when input component 70 moves in the direction in which load is applied as a result of the user performing a press input, restrict movement of input component 70 in the direction in which the load is applied by contacting input component 70.

(Pressure-Sensitive Sensor)

Pressure-sensitive sensor 30 detects load N placed on input component 70. In this example, pressure-sensitive sensor 30 is an electrostatic capacitive sensor, and is disposed between pressing component 75 of input component 70 and main substrate 61 via damper 81, so as to be aligned with pressing component 75 in the up and down directions. With this configuration, the load (load N) resulting from input component 70 being pressed down by object F is transferred to pressure-sensitive sensor 30 via pressing component 75 and damper 81.

(Drive Unit)

Drive unit 40 is configured to perform a predetermined operation. In this example, drive unit 40 is configured to vibrate input component 70 in response to control by drive controller 51 (to be described later). More specifically, drive unit 40 is disposed in a space defined by movable component 71 of input component 70, and vibrates horizontally to cause input component 70 to vibrate horizontally. Drive unit 40 is, for example, a piezoelectric body. Causing input component 70 to vibrate via drive unit 40 as described above makes it possible to provide haptic feedback to object F that is pressing down input component 70. More specifically, drive unit 40 is configured to vibrate in the directions indicated by the two-way arrow labeled "X" in FIG. 3 (i.e., vibrate horizontally) to cause movable component 71, input panel 72, and touch sensor 73 to vibrate horizontally relative to main body 20. Note that drive unit 40 is not limited to a piezoelectric body, and may be, for example, a motor or an electromagnetic actuator such as a solenoid.

(Controller)

Figure 4:
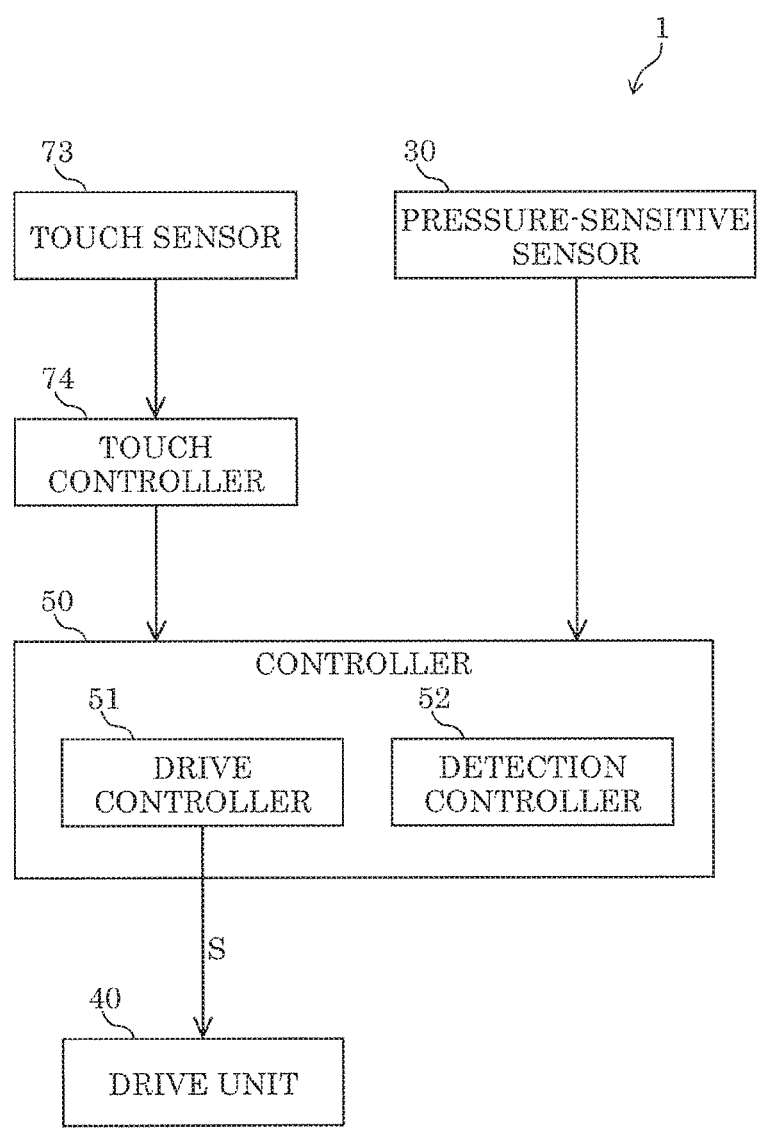
FIG. 4 is a block diagram illustrating an example of the structure of the input device according to Embodiment 1.

As illustrated in FIG. 4, controller 50 is electrically connected to pressure-sensitive sensor 30, drive unit 40, and touch controller 74, and is capable of relaying signals or information between pressure-sensitive sensor 30, drive unit 40, and touch controller 74. Moreover, upon receiving an input such as an ON input or an OFF input, controller 50 is configured to transmit the result of the input to an external device such as an on-board device. For example, controller 50 includes a computing processor such as a central processing unit (CPU), and storage such as memory that stores a program for operating the computing processor, or information. In this example, controller 50 includes drive controller 51 and detection controller 52. Drive controller 51 and detection controller 52 perform some of the functions of controller 50.

(Drive Controller)

Drive controller 51 is configured to monitor load N detected by pressure-sensitive sensor 30 and activate drive unit 40 when load N reaches a predetermined load threshold Nt. Note that in this example, load threshold Nt is a threshold provided for the press input that gradually increases load N placed on input component 70 (more specifically, the pressing of input component 70 by the finger of the user) (i.e., load threshold Nt is, more specifically, press threshold Nta). Thus, drive controller 51 activates drive unit 40 when load N detected by pressure-sensitive sensor 30 during the press input gradually increases and reaches press threshold Nta.

In this example, in accordance with press velocity V1, drive controller 51 changes at least one of the amplitude, the frequency, and the duration of the vibration applied to input component 70 by drive unit 40 during the press input. Note that press velocity V1 is the velocity of the change in load N detected by pressure-sensitive sensor 30 during the press input.

More specifically, in this example, drive controller 51 activates drive unit 40 by outputting drive signal S to drive unit 40. Drive signal S is an electric signal, and, for example, when drive signal S is supplied to drive unit 40, which is, for example, a piezoelectric body, drive unit 40 vibrates horizontally in accordance with drive signal S, and the horizontal vibration of drive unit 40 causes input component 70 to vibrate horizontally. Moreover, the amplitude, frequency, and duration of the vibration of drive unit 40 (vibration of input component 70) depends on the amplitude, frequency, and duration of drive signal S. In other words, the greater the amplitude of drive signal S, the greater the amplitude of the vibration of drive unit 40, the higher the frequency of drive signal S, the higher the frequency of the vibration of drive unit 40, and the longer the output duration of drive signal S is, the longer the duration of the vibration of drive unit 40 is.

(Detection Controller)

Detection controller 52 is configured to monitor load N detected by pressure-sensitive sensor 30, derive the velocity of the change in load N, and change load threshold Nt in accordance with the velocity of the change in load N. In this example, detection controller 52 derives press velocity V1 during a press input that gradually increases load N placed on input component 70 (i.e., derives the rate of change in load N detected by pressure-sensitive sensor 30 during the press input), and changes press threshold Nta in accordance with press velocity V1.

More specifically, detection controller 52 sets press threshold Nta in accordance with press velocity V1 such that the greater press velocity V1 is in the press input, the lower press threshold Nta is set. In this example, detection controller 52 sets press threshold Nta to first press threshold Nt1 when press velocity V1 does not exceed predetermined press velocity threshold Vta during the press input, and sets press threshold Nta to second press threshold Nt2 when press velocity V1 exceeds press velocity threshold Vta during the press input. Note that second press threshold Nt2 is lower than first press threshold Nt1. Accordingly, press threshold Nta decreases as press velocity V1 increases during press input.

(Input Device Operations)

Figure 5:
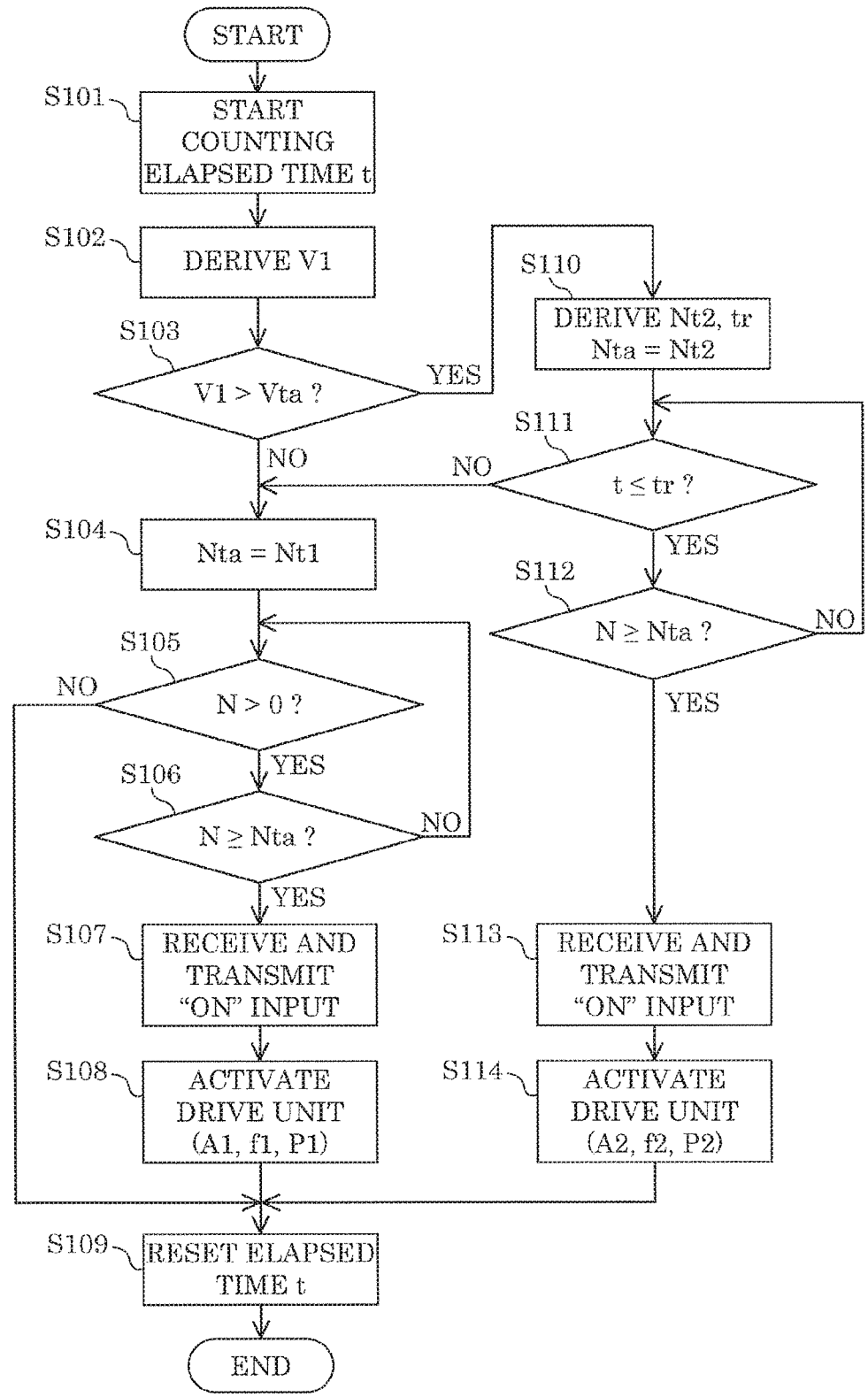
FIG. 5 is a flow chart illustrating an example of operations performed by the input device according to Embodiment 1.

Next, operations performed by input device 1 according to Embodiment 1 will be described with reference to FIG. 5. With input device 1 according to Embodiment 1, when a press input is started (more specifically, when the user starts to press down input component 70 with his or her finger), the following operations are performed.

(Step S101)

First, detection controller 52 starts counting elapsed time t starting when the press input starts.

(Step S102)

Next, detection controller 52 derives press velocity V1 based on load N detected by pressure-sensitive sensor 30. For example, detection controller 52 detects load N a plurality of times during a period starting when the press input starts and ending after elapse of a predetermined amount of time (hereinafter referred to as a "velocity derivation period"), calculates a plurality of rates of change in load N during the velocity derivation period based on the plurality of detected loads N, and sets press velocity V1 to the average of the plurality of rates of change in load N. Note that press velocity V1 is not limited to this example; press velocity V1 may be the mode value of the plurality of rates of change in load N during the velocity derivation period, and may be a velocity derived from the rate of change (slope) from load N at the start of the velocity derivation period to load N at the end of the velocity derivation period.

(Step S103)

Next, detection controller 52 determines whether press velocity V1 derived in step S102 exceeds press velocity threshold Vta or not. If press velocity V1 does not exceed press velocity threshold Vta, processing proceeds to step S104, otherwise processing proceeds to step S110.

(Step S104)

Next, detection controller 52 sets press threshold Nta to first press threshold Nt1.

(Step S105)

Next, detection controller 52 determines whether load N is greater than zero or not. If load N is greater than zero, processing proceeds to step S106, otherwise (e.g., when the user stops performing the press input midway) processing proceeds to step S109.

(Step S106)

Next, detection controller 52 determines whether load N detected by pressure-sensitive sensor 30 is greater than or equal to press threshold Nta (more specifically, first press threshold Nt1) or not (i.e., determines whether load N has reached press threshold Nta or not). If load N is greater than or equal to press threshold Nta, processing proceeds to step S107, otherwise processing returns to step S105.

(Step S107)

Once load N is greater than or equal to press threshold Nta (first press threshold Nt1), drive controller 51 detects that load N has reached press threshold Nta. With this, the press input is received as an ON input. Then, drive controller 51 starts performing operations for activating drive unit 40. In this example, drive controller 51 controls drive unit 40 by outputting to drive unit 40 drive signal S including predetermined first amplitude A1, predetermined first frequency f1, and predetermined first period P1. Moreover, controller 50 (drive controller 51) notifies an external device (e.g., an on-board device) that an ON input has been received.

(Step S108)

Drive unit 40 is activated in response to control by drive controller 51. This vibrates input component 70, and the vibration provides feedback to the finger of the user. Processing then proceeds to step S109.

(Step S109)

Next, detection controller 52 resets elapsed time t.

(Step S110)

If press velocity V1 exceeds press velocity threshold Vta in step S103, detection controller 52 derives second press threshold Nt2 and fast-input time tr based on press velocity V1.

For example, detection controller 52 derives second press threshold Nt2 by inserting, into the following equation, press velocity V1, a target value for load N when drive unit 40 is activated (target load Ns; in this example, the target value is equivalent to the load when vibration begins to be transferred to the finger of the user pressing input component 70 down), and the amount of time from when drive controller 51 detects that load N has reached press threshold Nta until drive unit 40 is driven (delay time tp).

$$Nt2 = Ns - V1 \times tp \qquad \text{[MATH. 1]}$$

Detection controller 52 derives fast-input time tr by inserting press velocity V1 and second press threshold Nt2 into the following equation.

$$tr = \frac{Nt2}{V1} \quad \text{[MATH. 2]}$$

Note that detection controller 52 may be configured to derive second press threshold Nt2 (or fast-input time tr) by detection controller 52 detecting second press threshold Nt2 (or fast-input time tr) corresponding to press velocity V1 obtained in step S102 from a table associating a plurality of press velocities V1 with a plurality of second press thresholds Nt2 (or fast-input times tr).

Detection controller 52 sets press threshold Nta to second press threshold Nt2.
(Step S111)

Next, detection controller 52 determines whether elapsed time t is less than or equal to fast-input time tr derived in step S110. If elapsed time t is less than or equal to fast-input time tr, processing proceeds to step S112, otherwise (e.g., when a press input is initially fast but slows down midway) processing proceeds to step S104.
(Step S112)

If elapsed time t is less than or equal to fast-input time tr, detection controller 52 determines whether load N detected by pressure-sensitive sensor 30 is greater than or equal to press threshold Nta (more specifically, second press threshold Nt2) (i.e., determines whether load N has reached press threshold Nta). If load N is greater than or equal to press threshold Nta, processing proceeds to step S113, otherwise processing returns to step S111.
(Step S113)

Once load N is greater than or equal to press threshold Nta (more specifically, second press threshold Nt2) during a period starting when the press input begins and ending when fast-input time tr elapses, drive controller 51 detects that load N has reached press threshold Nta. With this, the press input is received as an ON input. Then, drive controller 51 starts performing operations for activating drive unit 40. In this example, drive controller 51 controls drive unit 40 by outputting to drive unit 40 drive signal S including predetermined second amplitude A2, predetermined second frequency f2, and predetermined second period P2. Note that in this example, second amplitude A2 is greater than first amplitude A1, second frequency f2 is higher than first frequency f1, and second period P2 is shorter than first period P1. Moreover, controller 50 (drive controller 51) notifies an external device (e.g., an on-board device) that an ON input has been received.
(Step S114)

Drive unit 40 is activated in response to control by drive controller 51. This vibrates input component 70, and the vibration provides feedback to the finger of the user. Processing then proceeds to step S109)
(Specific Example of Input Device Operations)

Figure 6:
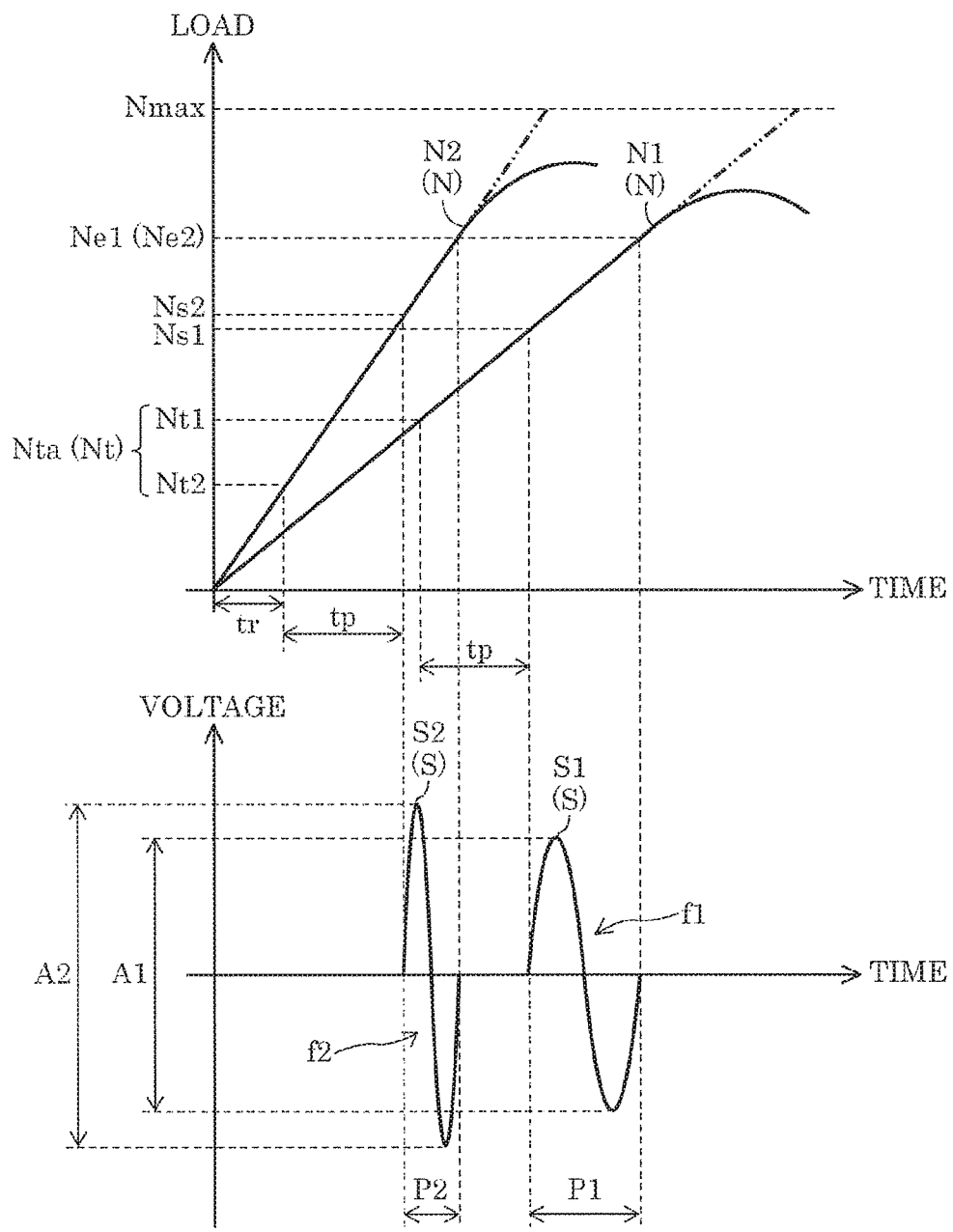
FIG. 6 is a graph illustrating an example of operations performed by the input device according to Embodiment 1.

Next, a specific example of operations performed by input device 1 according to Embodiment 1 will be given with reference to FIG. 6. Note that in FIG. 6, first load curve N1 indicates changes in load N over time during a press input in which press velocity V1 does not exceed press velocity threshold Vta (hereinafter, such a press input is referred to as a "slow press input"), and second load curve N2 indicates changes in load N over time during a press input in which press velocity V1 exceeds press velocity threshold Vta (hereinafter, such a press input is referred to as a "fast press input"). For example, first load curve N1 corresponds to changes in load N over time when the user presses input component 70 with his or her finger relatively slowly, and second load curve N2 corresponds to changes in load N over time when the user presses input component 70 with his or her finger relatively quickly. Moreover, first signal waveform S1 indicates the waveform of drive signal S output to drive unit 40 from drive controller 51 in a slow press input, and second signal waveform S2 indicates the waveform of drive signal S output to drive unit 40 from drive controller 51 in a fast press input.

If a slow press input is made (i.e., when load N changes along first load curve N1), detection controller 52 sets press threshold Nta to first press threshold Nt1. When load N reaches press threshold Nta (first press threshold Nt1), drive controller 51 starts performing operations for activating drive unit 40. Thereafter, when delay time tp (i.e., the amount of time required for processes from when a press input is received until drive controller 51 activates drive unit 40 to vibrate input component 70) elapses, drive signal S is supplied from drive controller 51 to drive unit 40 thus causing drive unit 40 and, by extension, input component 70, to vibrate.

On the other hand, if a fast press input is made (i.e., when load N changes along second load curve N2), detection controller 52 sets press threshold Nta to second press threshold Nt2. When load N reaches press threshold Nta (second press threshold Nt2), drive controller 51 starts performing operations for activating drive unit 40. Thereafter, when delay time tp elapses, drive signal S is supplied from drive controller 51 to drive unit 40 thus causing drive unit 40 and, by extension, input component 70, to vibrate.

Note that since press threshold Nta used in a fast press input (i.e., second press threshold Nt2) is set lower than press threshold Nta used in a slow press input (i.e., first press threshold Nt1), the timing at which drive controller 51 starts performing operations for activating drive unit 40 in a fast press input precedes the timing at which drive controller 51 starts performing operations for activating drive unit 40 in a slow press input. This makes it possible to reduce the difference between (i) load N that activates drive unit 40 which causes input component 70 to start vibrating in a slow press input (this load N is hereinafter referred to as "first activation load Ns1") and (ii) load N that activates drive unit 40 which causes input component 70 to start vibrating in a fast press input (this load N is hereinafter referred to as "second activation load Ns2").

Moreover, in this example, period P2 of drive signal S in a fast press input is set shorter than period P1 of drive signal S in a slow press input. This makes it possible to reduce the difference between (i) load N that stops operation of drive unit 40 and, by extension, stops vibrating input component 70 in a slow press input (this load N is hereinafter referred to as "first deactivation load Ne1") and (ii) load N that stops operation of drive unit 40 and, by extension, stops vibrating input component 70 in a fast press input (this load N is hereinafter referred to as "second deactivation load Ne2"). Note that in the example illustrated in FIG. 6, first deactivation load Ne1 and second deactivation load Ne2 are the same value.
(Advantages Effects Achieved by Embodiment 1)

As described above, by changing press threshold Nta (load threshold Nt) in accordance with press velocity V1 (rate of change in load N placed on input component 70) in a press input, drive controller 51 can adjust the timing at which operations for activating drive unit 40 (i.e., for activating feedback to be provided to the user) are started. This makes it possible to adjust load N (that is placed on input component 70) that activates drive unit 40. As a result, it is possible to reduce variations in load N arising from variations in press velocity V1 (i.e., variations in load N that activate drive unit 40). This in turn makes it possible to reduce variations in how it feels to operate input device 1.

Moreover, by changing, in accordance with press velocity V1, at least one of the amplitude, frequency, and duration of the vibration applied to input component 70 by drive unit 40 in a press input, it is possible to provide haptic feedback in accordance with press velocity V1.

In this example, drive controller 51, for example, increases the amplitude (or increases the frequency) of the vibration applied to input component 70 by drive unit 40 as press velocity V1 increases in a press input. Increasing the strength of the vibration of input component 70 makes it easier for the user to feel the haptic feedback even when the user only contacts input component 70 with his or her finger for a short duration. Note that drive controller 51 may decrease the amplitude (or decrease the frequency) of the vibration applied to input component 70 by drive unit 40 as press velocity V1 increases in a press input.

Moreover, in this example, drive controller 51, for example, reduces the duration of the vibration applied to input component 70 by drive unit 40 as press velocity V1 increases in a press input. Since this makes it possible to inhibit variations in the load N (placed on input component 70) that stops vibration of input component 70 due to variations in press velocity V1, thereby making it possible to reduce variations in how it feels to operate input device 1. For example, it is possible to maintain load N that stops vibration of input component 70 at a constant value across a plurality of press inputs. Note that drive controller 51 may increase the duration of the vibration applied to input component 70 by drive unit 40 as press velocity V1 increases in a press input.

(Operations for Setting Press Velocity Threshold)

Figure 7:
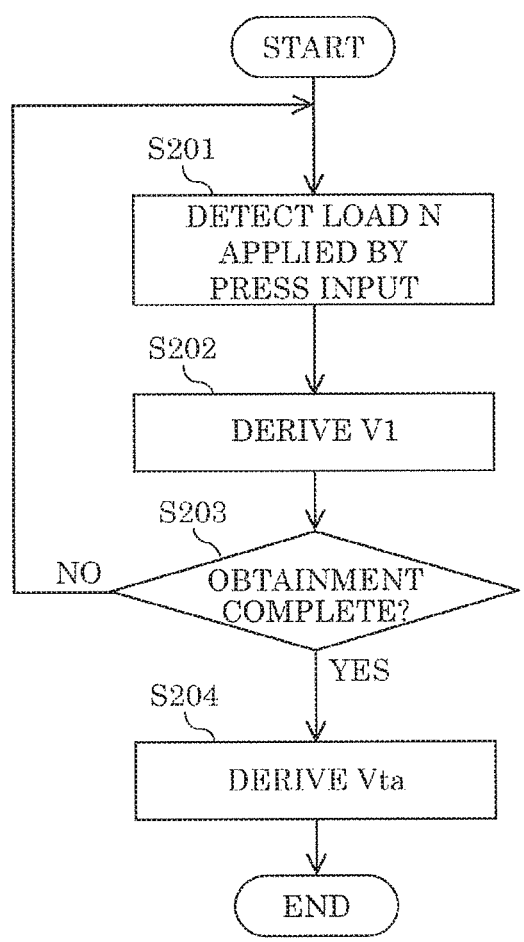
FIG. 7 is a flow chart illustrating an example of operations for setting the press velocity threshold.

Next, operations performed by input device 1 according to Embodiment 1 for setting press velocity threshold Vta will be described with reference to FIG. 7. Press velocity threshold Vta may be set based on a plurality of press velocities V1 obtained by a user performing a press input a plurality of times. Note that the operations illustrated in FIG. 7 illustrate one example of a learning correction process for press velocity threshold Vta.

(Step S201)

First, a press input is made by the user. More specifically, the user presses input component 70 with his or her finger, causing load N placed on input component 70 to gradually increase. Detection controller 52 obtains load N detected by pressure-sensitive sensor 30 (i.e., load N placed on input component 70).

(Step S202)

Next, detection controller 52 derives press velocity V1 based on load N detected by pressure-sensitive sensor 30. For example, similar to step S101 illustrated in FIG. 5, detection controller 52 detects load N a plurality of times during a velocity derivation period (a period starting when the press input starts and ending after elapse of a predetermined amount of time), calculates a plurality of rates of change in load N during the velocity derivation period based on the plurality of detected loads N, and sets press velocity V1 to the average of the plurality of rates of change in load N.

(Step S203)

Next, detection controller 52 determines whether enough press velocities V1 have been obtained to derive press velocity threshold Vta. For example, detection controller 52 determines whether a predetermined number of press velocities V1 have been obtained as the result of the user performing the press input a predetermined number of times. If enough press velocities V1 to derive press velocity threshold Vta have been obtained, processing proceeds to step S204, otherwise processing returns to step S201.

(Step S204)

Next, detection controller 52 derives press velocity threshold Vta based on press velocities V1 obtained in steps S201 through S203. For example, detection controller 52 takes the average of press velocities V1 obtained in steps S201 through S203 as press velocity threshold Vta.

As described above, press velocity threshold Vta can be set to a velocity suited to the user by setting press velocity threshold Vta based on a plurality of press velocities V1 obtained by a user performing a press input a plurality of times. This makes it possible to provide haptic feedback suitable for the user.

Note that press velocity threshold Vta may be a predetermined velocity and need not be a velocity obtained through learning correction.

Variation of Embodiment 1

Note that drive controller 51 may be configured to perform the following operations. When load N detected by pressure-sensitive sensor 30 during a press input reaches a predetermined maximum load Nmax, drive controller 51 may change, among the amplitude, the frequency, and the duration of the vibration applied to input component 70 by drive unit 40, at least the amplitude. Note that maximum load Nmax is set to a value greater than a value of load N at contact between input component 70 and stopper 90 during a press input.

As described above, it is possible to take into account friction between input component 70 and stopper 90 when determining vibration parameters for input component 70 by changing at least the amplitude—among the amplitude, frequency, and duration—of the vibration of input component 70 applied by drive unit 40 when load N reaches maximum load Nmax.

For example, drive controller 51 may increase the amplitude of the vibration of input component 70 by drive unit 40 when load N detected by pressure-sensitive sensor 30 reaches maximum load Nmax in a press input. Controlling drive unit 40 in this manner makes it possible to vibrate input component 70 so as to defeat the friction between input component 70 and stopper 90.

Moreover, drive controller 51 may increase the frequency of the vibration of input component 70 by drive unit 40 when load N detected by pressure-sensitive sensor 30 reaches maximum load Nmax in a press input. Controlling drive unit 40 in this manner makes it possible to vibrate input component 70 so as to defeat the friction between input component 70 and stopper 90.

Moreover, drive controller 51 may increase the duration of the vibration of input component 70 by drive unit 40 when load N detected by pressure-sensitive sensor 30 reaches maximum load Nmax in a press input. Controlling drive unit 40 in this manner makes it possible to vibrate input component 70 so as to defeat the friction between input component 70 and stopper 90.

(Operations Performed for Consecutive Press Inputs)

Figure 8:
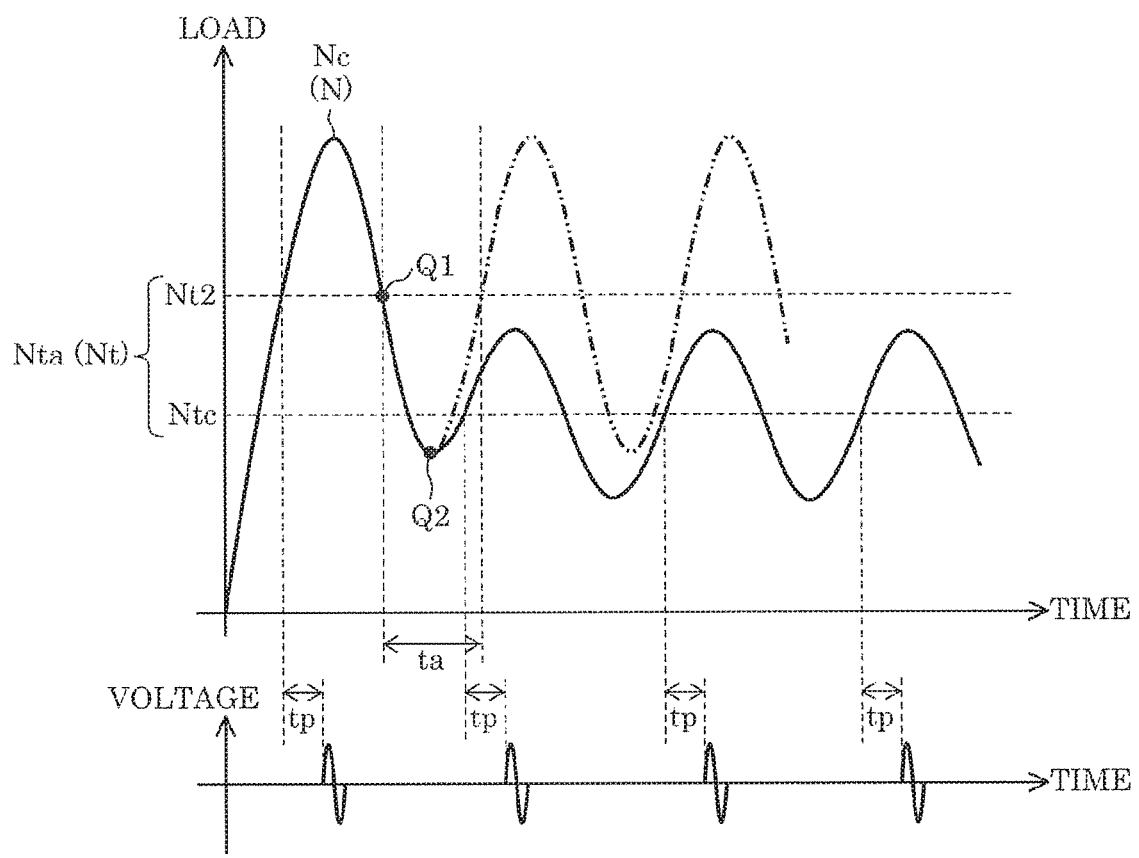
FIG. 8 is a flow chart illustrating an example of operations performed for consecutive press inputs.

Next, operations performed by input device 1 according to Embodiment 1 for consecutive press inputs (i.e., when a press input is repeated consecutively) will be described with reference to FIG. 8. In FIG. 8, load curve Nc indicates changes in load N over time across consecutive press inputs. In the example illustrated in FIG. 8, after the first press input is made, load N decreases and reaches point Q1 at which load N reaches press threshold Nta (more specifically, second press threshold Nt2), and then at point Q2, begins to increase.

In this variation, detection controller 52 is configured to operate as follows for consecutive press inputs, when a press input is repeated two or more times consecutively, detection controller 52 sets press threshold Nta for second and subsequent instances of the press input lower than press threshold Nta set for a first instance of the press input. More specifically, detection controller 52 determines whether load N begins to increase in a period starting when load N reduces and reaches press threshold Nta (second press threshold NL2 in the example illustrated in FIG. 8) after a press input is made for the first time and ending when a predetermined consecutive determination time ta elapses (hereinafter referred to as a "consecutive determination period"). Then, when load N begins to increase in the consecutive determination period, detection controller 52 sets press threshold Nta to consecutive press threshold Ntc. Note that consecutive press threshold Ntc is set lower than press threshold Nta in the first press input (second press threshold Nt2 in the example illustrated in FIG. 8) and set such that drive controller 51 can perform operations for activating drive unit 40 in second and subsequent press inputs. Moreover, when load N begins to increase in the consecutive determination period, detection controller 52 performs the operations illustrated in FIG. 5 when the next press input is started.

As described above, detection controller 52 setting press threshold Nta for second and subsequent instances of the press input lower than press threshold Nta set for a first instance of the press input when a press input is repeated two or more times consecutively makes it possible to vibrate drive unit 40 in response to each of the consecutively repeated press inputs. This makes it possible to provide suitable haptic feedback when a press input is made two or more times consecutively.

Moreover, since press threshold Nta for second and subsequent press inputs is set lower than press threshold Nta for the first press input, even if the second and subsequent press inputs are light (weak), those press inputs can be received. Accordingly, it is possible to reduce the amount of work required of the user in second and subsequent press inputs.

Embodiment 2

Input device 1 according to Embodiment 2 differs from input device 1 according to Embodiment 1 in regard to operations performed by drive controller 51 and detection controller 52. Other configurations in input device 1 according to Embodiment 2 are the same as input device 1 according to Embodiment 1.

(Drive Controller)

Drive controller 51 is configured to monitor load N detected by pressure-sensitive sensor 30 and activate drive unit 40 when load N reaches a predetermined load threshold Nt. Note that in this example, load threshold Nt is a predetermined threshold provided for a release input that gradually reduces load N placed on input component 70 (more specifically, the user distancing his or her finger from input component 70) (i.e., load threshold Nt is, more specifically, release threshold Ntb). Drive controller 51 activates drive unit 40 when load N detected by pressure-sensitive sensor 30 during the release input gradually decreases and reaches release threshold Ntb.

In this example, in accordance with release velocity V2, drive controller 51 changes at least one of the amplitude, the frequency, and the duration of the vibration applied to input component 70 by drive unit 40 during the release input. Note that release velocity V2 is the velocity of the change in load N detected by pressure-sensitive sensor 30 during a release input.

Moreover, in contrast to press velocity V1 described in Embodiment 1, since load N decreases over time, release velocity V2 is negative. Accordingly, in the following description, release velocity V2 is described as an absolute value.

(Detection Controller)

Detection controller 52 is configured to monitor load N detected by pressure-sensitive sensor 30, derive the velocity of the change in load N, and change load threshold Nt in accordance with the velocity of the change in load N. In this example, detection controller 52 derives release velocity V2 in a release input defined by a gradual decrease in load N placed on input component 70 (i.e., derives a rate of change in load N detected by pressure-sensitive sensor 30 in a release input), and changes release threshold Ntb in accordance with the derived release velocity V2.

More specifically, detection controller 52 increases release threshold Ntb as release velocity V2 increases in a release input. In this example, in a release input, detection controller 52 sets release threshold Ntb to first release threshold Nt3 when release velocity V2 does not exceed a predetermined release velocity threshold Vtb. and sets release threshold Ntb to second release threshold Nt4 when release velocity V2 exceeds release velocity threshold Vtb. Note that second release threshold Nt4 is higher than first release threshold Nt3. Accordingly, release threshold Ntb increases as release velocity V2 increases in a release input.

(Input Device Operations)

Figure 9:
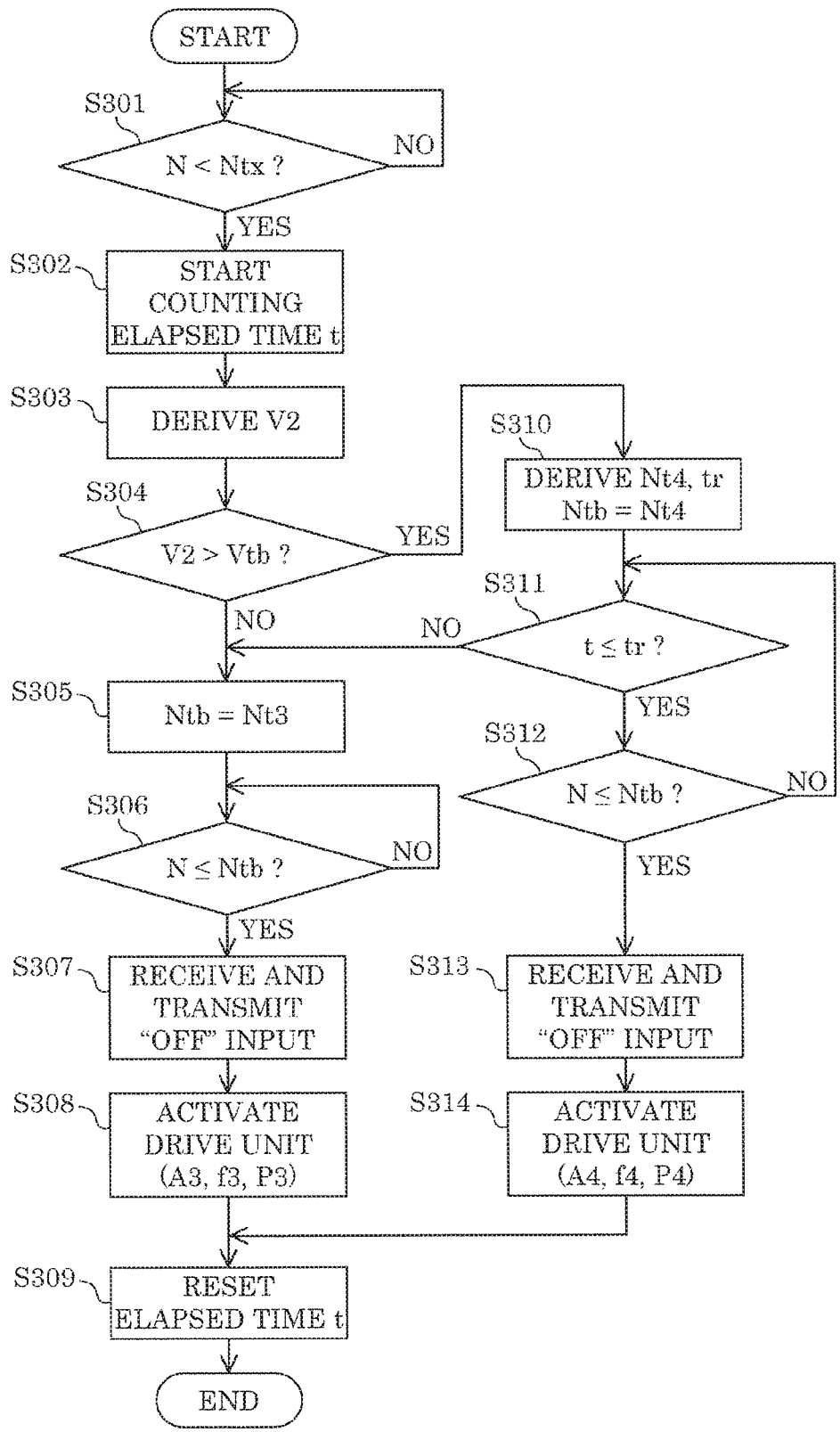
FIG. 9 is a flow chart illustrating an example of operations performed by the input device according to Embodiment 2.

Next, operations performed by input device 1 according to Embodiment 2 will be described with reference to FIG. 9. With input device 1 according to Embodiment 2, when a release input is started (more specifically, when the user starts to remove his or her finger from input component 70), the following operations are performed.

(Step S301)

First, detection controller 52 determines whether load N has dropped below a predetermined reference threshold Ntx (in this example, press threshold Nta). If load N has dropped below reference threshold Ntx, processing proceeds to step S302, otherwise processing repeats step S301.

(Step S302)

Next, detection controller 52 starts counting elapsed time t starting when load N is determined to drop below reference threshold Ntx in step S301.

(Step S303)

Next, detection controller 52 derives release velocity V2 based on load N detected by pressure-sensitive sensor 30. For example, detection controller 52 detects load N a plurality of times during a period starting when load N is determined to drop below reference threshold Ntx in step S301 and ending after elapse of a predetermined amount of time (hereinafter referred to as a "velocity derivation period"), calculates a plurality of rates of change in load N during the velocity derivation period based on the plurality of detected loads N, and sets release velocity V2 to the average of the plurality of rates of change in load N. Note that release velocity V2 is not limited to this example; release velocity V2 may be the mode value of the plurality of rates of change in load N during the velocity derivation period, and may be a velocity derived from the rate of change (slope) from load N at the start of the velocity derivation period to load N at the end of the velocity derivation period.
(Step S304)
Next, detection controller 52 determines whether release velocity V2 derived in step S303 exceeds release velocity threshold Vtb or not. If release velocity V2 does not exceed release velocity threshold Vtb, processing proceeds to step S305, otherwise processing proceeds to step S310.
(Step S305)
Next, detection controller 52 sets release threshold Ntb to first release threshold Nt3.
(Step S306)
Next, detection controller 52 determines whether load N detected by pressure-sensitive sensor 30 is less than or equal to release threshold Ntb (more specifically, first release threshold Nt3) (i.e., determines whether load N has reached release threshold Ntb). If load N is less than or equal to release threshold Ntb, processing proceeds to step S307, otherwise processing repeats to step S306.
(Step S307)
Once load N is less than or equal to release threshold Ntb (more specifically, first release threshold Nt3), drive controller 51 detects that load N has reached release threshold Ntb. With this, the release input is received as an OFF input. Then, drive controller 51 starts performing operations for activating drive unit 40. In this example, drive controller 51 controls drive unit 40 by outputting to drive unit 40 drive signal S including predetermined third amplitude A3, predetermined third frequency f3, and predetermined third period P3. Moreover, controller 50 (drive controller 51) notifies an external device (e.g., an on-board device) that an OFF input has been received.
(Step S308)
Drive unit 40 is activated in response to control by drive controller 51. This vibrates input component 70, and the vibration provides feedback to the finger of the user. Processing then proceeds to step S309.
(Step S309)
Next, detection controller 52 resets elapsed time t.
(Step S310)
If release velocity V2 exceeds release velocity threshold Vtb in step S304, detection controller 52 derives second release threshold Nt4 and fast-input time tr based on release velocity V2.

For example, detection controller 52 derives second release threshold Nt4 by inserting, into the following equation, release velocity V2, a target value for load N when drive unit 40 is activated (target load Ns; in this example, the target value is equivalent to the load when vibration begins to be transferred to the finger of the user removing his or her finger from input component 70 down), and the amount of time from when drive controller 51 detects that load N has reached release threshold Ntb until drive unit 40 is driven (delay time tp).

$$Nt4 = Ns + V2 \times tp \quad \text{[MATH. 3]}$$

Detection controller 52 derives fast-input time tr by inserting load N at the start of the release input (reference load Nr), release velocity V2, and second release threshold Nt4 into the following equation. Note that here, release velocity V2 is assumed to be constant from when load N is reference load Nr until load N reaches second release threshold Nt4, and fast-input time tr is derived by linear approximation.

$$tr = \frac{Nr - Nt4}{V2} \quad \text{[MATH. 4]}$$

Note that detection controller 52 may be configured to derive second release threshold Nt4 (or fast-input time tr) by detection controller 52 detecting second release threshold Nt4 (or fast-input time tr) corresponding to release velocity V2 obtained in step S303 from a table associating a plurality of release velocities V2 with a plurality of second release thresholds Nt4 (or fast-input times tr).

Figure 10:
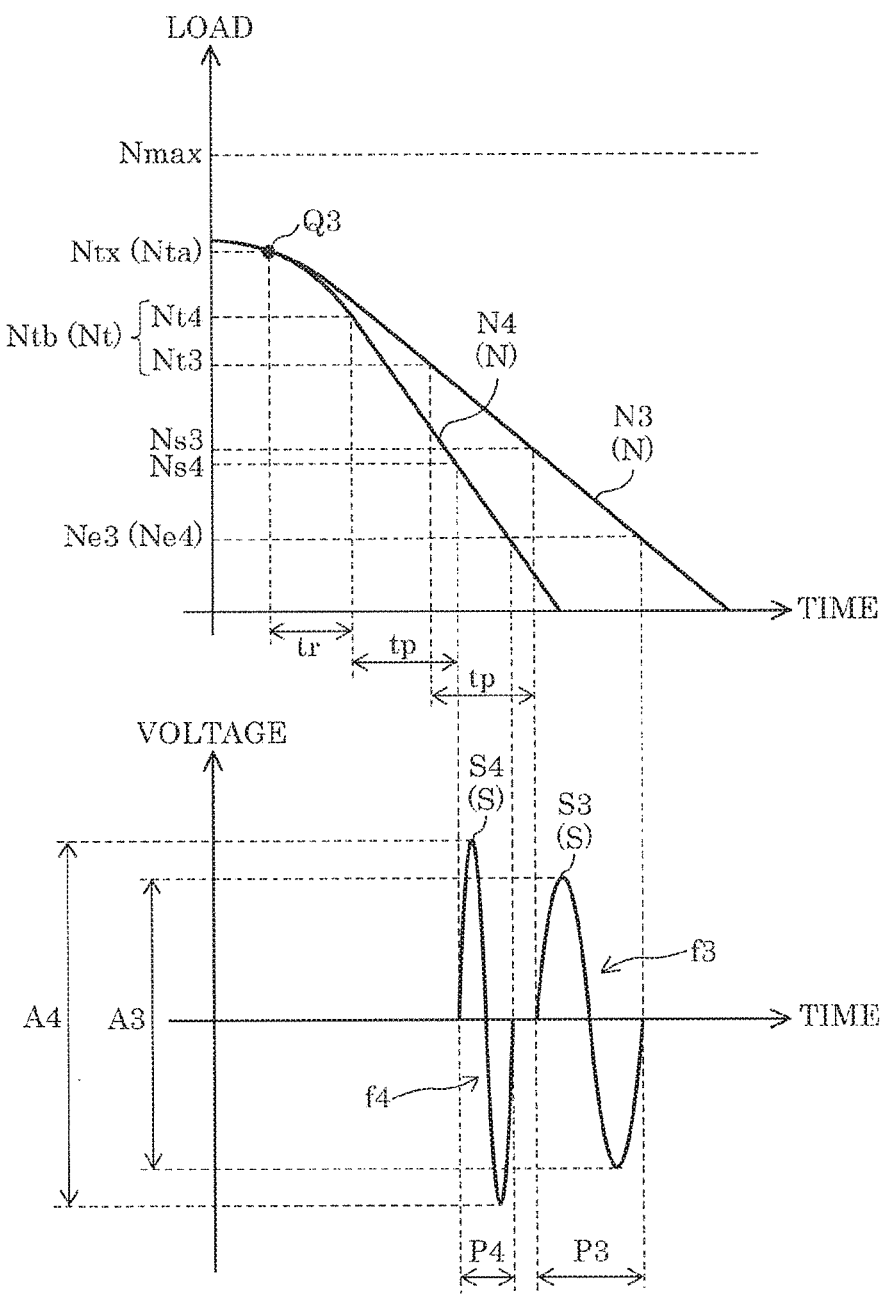
FIG. 10 is a graph illustrating an example of operations performed by the input device according to Embodiment 2.

Detection controller 52 alternatively sets release threshold Ntb to second release threshold Nt4.
(Step S311)
Next, detection controller 52 determines whether elapsed time t is less than or equal to fast-input time tr derived in step S310. If elapsed time t is less than or equal to fast-input time tr, processing proceeds to step S312, otherwise (e.g., when a release input is initially fast but slows down midway) processing proceeds to step S305.
(Step S312)
If elapsed time t is less than or equal to fast-input time tr, detection controller 52 determines whether load N detected by pressure-sensitive sensor is less than or equal to release threshold Ntb (more specifically, second release threshold Nt4) (i.e., determines whether load N has reached release threshold Ntb). If load N is less than or equal to release threshold Ntb, processing proceeds to step S313, otherwise processing returns to step S311.
(Step S313)
Once load N is less than or equal to release threshold Ntb (more specifically, second release threshold Nt4) in a period from when load N is determined to drop below reference threshold Ntx in step S301 until fast-input time tr elapses, drive controller 51 detects that load N has reached release threshold Ntb. With this, the release input is received as an OFF input. Then, drive controller 51 starts performing operations for activating drive unit 40. In this example, drive controller 51 controls drive unit 40 by outputting to drive unit 40 drive signal S including predetermined fourth amplitude A4, predetermined fourth frequency f4, and predetermined fourth period P4. Note that in this example, fourth amplitude A4 is greater than third amplitude A3, fourth frequency f4 is greater than third frequency f3, and fourth period P4 is shorter than third period P3. Moreover, controller 50 (drive controller 51) notifies an external device (e.g., an on-board device) that an OFF input has been received.
(Step S314)
Drive unit 40 is activated in response to control by drive controller 51. This vibrates input component 70, and the vibration provides feedback to the finger of the user. Processing then proceeds to step S309.
(Specific Example of Input Device Operations)
Next, a specific example of operations performed by input device 1 according to Embodiment 2 will be given with reference to FIG. 10. Note that in FIG. 10, third load curve N3 indicates changes in load N over time when release velocity V2 does not exceed release velocity threshold Vtb in a release input (hereinafter such an input is referred to as a "slow release input", and fourth load curve N4 indicates changes in load N over time when release velocity V2 exceeds release velocity threshold Vtb in a release input (hereinafter such an input is referred to as a "fast release input". For example, third load curve N3 corresponds to changes in load N over time when the user removes his or her finger relatively slowly from input component 70, and fourth load curve N4 corresponds to changes in load N over time when the user removes his or her finger relatively quickly from input component 70. Moreover, third signal waveform S3 indicates the waveform of drive signal S output to drive unit 40 from drive controller 51 in a slow release input, and fourth signal waveform S4 indicates the waveform of drive signal S output to drive unit 40 from drive controller 51 in a fast release input. Point Q3 indicates the point in time when load N is determined to drop below reference threshold Ntx in step S301.

If a slow release input is made (i.e., when load N changes along third load curve N3), detection controller 52 sets release threshold Ntb to first release threshold Nt3. When load N reaches release threshold Ntb (first release threshold Nt3), drive controller 51 starts performing operations for activating drive unit 40. Thereafter, when delay time tp elapses, drive signal S is supplied from drive controller 51 to drive unit 40 thus causing drive unit 40 and, by extension, input component 70, to vibrate.

If a fast release input is made (i.e., when load N changes along fourth load curve N4), detection controller 52 sets release threshold Ntb to second release threshold Nt4. When load N reaches release threshold Ntb (second release threshold Nt4), drive controller 51 starts performing operations for activating drive unit 40. Thereafter, when delay time tp elapses, drive signal S is supplied from drive controller 51 to drive unit 40 thus causing drive unit 40 and, by extension, input component 70, to vibrate.

Note that since release threshold Ntb used in a fast release input (i.e., second release threshold Nt4) is set higher than release threshold Ntb used in a slow release input (i.e., first release threshold Nt3), the timing at which drive controller 51 starts performing operations for activating drive unit 40 in a fast release input precedes the timing at which drive controller 51 starts performing operations for activating drive unit 40 in a slow release input. This makes it possible to reduce the difference between (i) load N that activates drive unit 40 which causes input component 70 to start vibrating in a slow release input (this load N is hereinafter referred to as "third activation load Ns3") and (ii) load N that activates drive unit 40 which causes input component 70 to start vibrating in a fast release input (this load N is hereinafter referred to as "fourth activation load Ns4").

Moreover, in this example, period P4 of drive signal S in a fast release input is set shorter than period P3 of drive signal S in a slow release input. This makes it possible to reduce the difference between (i) load N that stops operation of drive unit 40 and, by extension, stops vibrating input component 70 in a slow release input (this load N is hereinafter referred to as "third deactivation load Ne3") and (ii) load N that stops operation of drive unit 40 and, by extension, stops vibrating input component 70 in a fast release input (this load N is hereinafter referred to as "fourth deactivation load Ne4"). Note that in the example illustrated in FIG. 10, third deactivation load Ne3 and fourth deactivation load Ne4 are the same value.

(Advantages Effects Achieved by Embodiment 2)

As described above, by changing release threshold Ntb (load threshold Nt) in accordance with release velocity V2 (rate of change in load N placed on input component 70) in a release input, drive controller 51 can adjust the timing at which operations for activating drive unit 40 (i.e., for activating feedback to be provided to the user) are started. This makes it possible to adjust load N (that is placed on input component 70) at which drive unit 40 is activated. As a result, it is possible to reduce variations in load N arising from variations in release velocity V2 (i.e., variations in load N that activate drive unit 40). This in turn makes it possible to reduce variations in how it feels to operate input device 1.

Moreover, by changing, in accordance with release velocity V2, at least one of the amplitude, frequency, and duration of the vibration applied to input component 70 by drive unit 40 in a release input, it is possible to provide haptic feedback in accordance with release velocity V2.

In this example, drive controller 51, for example, increases the amplitude (or increases the frequency) of the vibration applied to input component 70 by drive unit 40 as release velocity V2 increases in a release input. Increasing the strength of the vibration of input component 70 makes it easier for the user to feel the haptic feedback even when the user only contacts input component 70 with his or her finger for a short duration. Note that drive controller 51 may decrease the amplitude (or decrease the frequency) of the vibration applied to input component 70 by drive unit 40 as release velocity V2 increases in a release input.

Moreover, in this example, drive controller 51, for example, reduces the duration of the vibration applied to input component 70 by drive unit 40 as release velocity V2 increases in a release input. Since this makes it possible to inhibit variations in the load N (placed on input component 70) that stops vibration of input component 70 due to variations in release velocity V2, thereby making it possible to reduce variations in how it feels to operate input device 1. For example, it is possible to set load N that stops vibration of input component 70 to a constant value across a plurality of release inputs. Note that drive controller 51 may increase the duration of the vibration applied to input component 70 by drive unit 40 as release velocity V2 increases in a release input.

(Operations for Setting Release Velocity Threshold)

Figure 11:
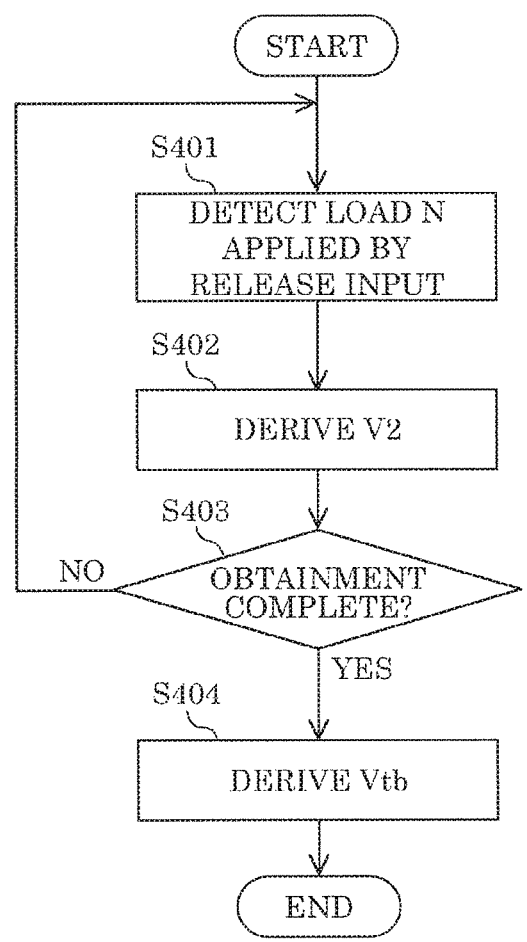
FIG. 11 is a flow chart illustrating an example of operations for setting the release velocity threshold.

Next, operations performed by input device 1 according to Embodiment 2 for setting release velocity threshold Vtb will be described with reference to FIG. 11. Release velocity threshold Vtb may be set based on a plurality of release velocities V2 obtained by a user performing a release input a plurality of times. Note that the operations illustrated in FIG. 11 illustrate one example of a learning correction process for release velocity threshold Vtb.

(Step S401)

First, a release input is made by the user. More specifically, the user moves his or her finger away from input component 70, causing load N placed on input component 70 to gradually decrease. Detection controller 52 obtains load N detected by pressure-sensitive sensor 30 (i.e., load N placed on input component 70).

(Step S402)

Next, detection controller 52 derives release velocity V2 based on load N detected by pressure-sensitive sensor 30. For example, similar to step S303 illustrated in FIG. 9, detection controller 52 detects load N a plurality of times during a velocity derivation period (a period starting when the release input starts and ending after elapse of a predetermined amount of time), calculates a plurality of rates of change in load N during the velocity derivation period based on the plurality of detected loads N, and sets release velocity V2 to the average of the plurality of rates of change in load N.

(Step S403)

Next, detection controller 52 determines whether enough release velocities V2 have been obtained to derive release velocity threshold Vtb. For example, detection controller 52 determines whether a predetermined number of release velocities V2 have been obtained as the result of the user performing a release input a predetermined number of times. If enough release velocities V2 to derive release velocity threshold Vtb have been obtained, processing proceeds to step S404, otherwise processing returns to step S401.
(Step S404)

Next, detection controller 52 derives release velocity threshold Vtb based on release velocities V2 obtained in steps S401 through S403. For example, detection controller 52 takes the average of release velocities V2 obtained in steps S401 through S403 as release velocity threshold Vtb.

As described above, release velocity threshold Vtb can be set to a velocity suited to the user by setting release velocity threshold Vtb based on a plurality of release velocities V2 obtained by a user performing a release input a plurality of times. This makes it possible to provide haptic feedback suitable for the user.

Note that release velocity threshold Vtb may be a predetermined velocity and need not be a velocity obtained through learning correction.

Embodiment 3

Input device 1 according to Embodiment 3 differs from input devices 1 according to Embodiments 1 and 2 in regard to operations performed by controller 50. Other configurations in input device 1 according to Embodiment 3 are the same as input devices 1 according to Embodiments 1 and 2.

Controller 50 includes an electrically-connected storage (not illustrated in the drawings). This storage stores, for example, information pertaining to pressure threshold Pt, reference vibration strength Vb, coefficients C (to be described later). Note that in this embodiment, the storage is configured as a part of controller 50.

Controller 50 is configured to detect load N when a press input is made on input panel 72, causing movable component 71 to move downward relative to main body 20, which in turn causes pressing component 75 to press down on pressure-sensitive sensor 30 via damper 81.

Then, based on contact area A of object F output from touch sensor 73 (touch controller 74) and load N output from pressure-sensitive sensor 30, controller 50 determines the state of the press input being made on touch sensor 73, and provides haptic feedback to object F in accordance with the state of the press.

Controller 50 also calculates the value of pressure P applied to touch sensor 73 by dividing load N by contact area A, and determines whether a press input has been made on touch sensor 73 by comparing the value of pressure P with a predetermined pressure threshold Pt. In other words, the "state" of the press input includes whether a press input is being made or not. Controller 50 is configured so as to be capable of setting pressure threshold Pt to an arbitrary value.

Controller 50 also calculates vibration strength Va for drive unit 40, based on contact area A. More specifically, controller 50 calculates vibration strength Va so as to increase as contact area A increases.

Furthermore, controller 50 stores reference vibration strength Vb for drive unit 40 and coefficients C corresponding to contact areas A, and calculates vibration strengths Va corresponding to contact areas A from mathematical products of coefficients C and reference vibration strength Vb. A specific example of vibration strengths Va corresponding to contact areas A is given in Table 1.

TABLE 1

| Contact area A [$mm^2$] | Coefficient C corresponding to contact area | Reference vibration strength Vb [$m/s^2$] | Vibration strength (vibration acceleration) Va [$m/s^2$] |
|---|---|---|---|
| 4 π | 0.5 | 19.6 | 9.8 |
| 9 π | 0.7 | | 13.7 |
| 16 π | 0.9 | | 17.6 |
| 25 π | 1.0 | | 19.6 |
| 36 π | 1.2 | | 23.5 |
| 49 π | 1.5 | | 29.4 |
| 64 π | 2.0 | | 39.2 |

In the example given in Table 1, vibration acceleration is used as vibration strength Va. Although reference vibration strength Vb is set to 19.6 $m/s^2$ in the example given in Table 1, reference vibration strength Vb is not limited to this value; reference vibration strength Vb may be set to an arbitrary value.

Next, a sequence of processing operations performed by controller 50 will be described with reference to FIG. 12.

Figure 12:
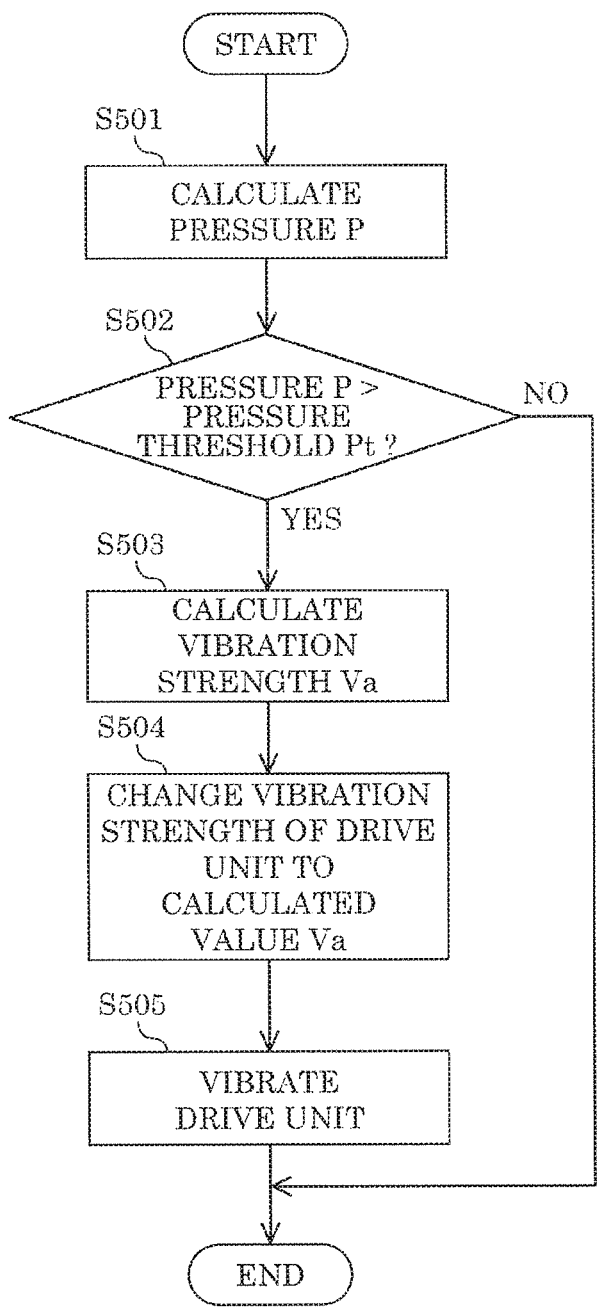
FIG. 12 is a flow chart illustrating processing operations performed by the controller in a press input, in the input device according to Embodiment 3.

Here, the operations illustrated in FIG. 12 are repeatedly performed via a main routine (no illustrated in the drawings; i.e., controller 50 performs operations such as retrieving position information for a press input from touch controller 74 and outputting the position information to an external device) executed by controller 50.
(Step S501)

As illustrated in FIG. 12, in the first step S501, controller 50 detects contact area A when a press input is made on input surface 72a of input panel 72 by object F, and calculates the value of pressure P from the detected contact area A and load N when pressure-sensitive sensor 30 was pressed by pressing component 75. More specifically, controller 50 calculates the value of pressure P by dividing load N output from pressure-sensitive sensor 30 in the press input by contact area A.
(Step S502)

In step S502, controller 50 compares the value of pressure P calculated in step S501 with a predetermined pressure threshold Pt, and determines whether the value of pressure P exceeds pressure threshold Pt or not. More specifically, when the value of pressure P is greater than pressure threshold Pt (YES), controller 50 determines that a press input has been made on input panel 72 and is in an ON state, and processing proceeds to step S503. When the value of pressure P is less than pressure threshold Pt (NO), controller 50 determines that a press input has not been made on touch sensor 73 and is in an OFF state, and ends the sequence of processing operations without driving drive unit 40.
(Step S503)

In step S503, controller 50 calculates vibration strength Va for drive unit 40, based on contact area A in the press input. For example, controller 50 calculates vibration strength Va such that haptic feedback increases with an increase in contact area A. More specifically, based on Table 1 above, controller 50 may calculate vibration strength Va from a mathematical product of coefficients C corresponding to contact area A and reference vibration strength Vb.
(Step S504)

In step S504, controller 50 changes the vibration strength for drive unit 40 to the calculated value (vibration strength Va) obtained by the calculation in step S503.
(Step S505)

In step S505, controller 50 sets the vibration strength for drive unit 40 to the calculated value (vibration strength Va) and drives drive unit 40. With this, movable component 71, input panel 72, and touch sensor 73 vibrate horizontally relative to main body 20, providing haptic feedback to object F that is appropriate for the state of the press input.

This completes the sequence of operations performed by controller 50.

(Advantageous Effects Achieved by Embodiment 3)

In this way, with input device 1, controller 50 determines the state of the press input based on contact area A and load N, and provides haptic feedback to object F in accordance with the state of the press. This makes it possible to appropriately adjust the strength of how it feels for object F to perform the press input in accordance with the state of the press input. This in turn makes it possible to make the strength of how it feels to perform the press input consistent regardless of the magnitude of contact area A. Accordingly, with input device 1 according to this embodiment, it is possible to make how it feels for object F to perform a press input consistent.

Controller 50 also calculates the value of pressure P applied to touch sensor 73 by dividing load N by contact area A, and determines whether a press input has been made on input panel 72 by comparing the value of pressure P with a predetermined pressure threshold Pt. In this way, it is possible to accurately determine whether a press input has been made regardless of the magnitude of contact area A by converting load N into pressure P and comparing the pressure P with a predetermined pressure threshold Pt.

Controller 50 is configured so as to be capable of setting pressure threshold Pt to an arbitrary value. In other words, the pressure value acting as the reference for determining whether a press input is being made or not can be changed as appropriate for the application of input device 1.

Controller 50 also calculates vibration strength Va for drive unit 40, based on contact area A. This makes it possible to set the strength of the haptic feedback provided by the vibration of drive unit 40 to a strength that is suitable for the magnitude of contact area A of object F. In particular, when the values of contact area A and load N are large, as a result of the vibration of drive unit 40 being restricted, haptic feedback may detrimentally decrease. However, with input device 1 according to this embodiment, since vibration strength Va of drive unit 40 is calculated based on contact area A taking into this detriment into account, it is possible to provide haptic feedback to object F that is suitable for the magnitude of contact area A.

For example, controller 50 calculates vibration strength Va such that haptic feedback increases with an increase in contact area A. This generates more haptic feedback when, for example, the press input is made with the palm of the user's hand compared to when the press input is made with the user's finger. This in turn makes it possible to make the strength of how it feels to perform the press input consistent regardless of the magnitude of contact area A.

Controller 50 calculates vibration strength Va corresponding to contact area A from the mathematical product of coefficient C corresponding to contact area A and reference vibration strength Vb. Since the relationship between contact area A and vibration strength Va can be calculated with a predetermined mathematical formula, there is no need for a settings table for the vibration strength, thereby simplifying the calculation of vibration strength Va.

Controller 50 is configured so as to be capable of setting reference vibration strength Vb to an arbitrary value. In other words, the reference vibration strength for drive unit 40 can be changed as appropriate for the application of input device 1.

Variation of Embodiment 3

In the non-limiting example of the processing operations performed by controller 50 given in FIG. 12 described in the above embodiment, when the value of pressure P is greater than pressure threshold Pt (YES) in step S502, a press input is determined to have been made thereby inducing an ON state, and drive unit 40 is vibrated in step S505 after processing completes steps S503 and S504.

As a variation of the above embodiment, controller 50 may perform processing operations whereby the press input is determined to have transitioned from an ON state to an OFF state when the value of pressure P is lower than pressure threshold Pt (YES) in step S502 in FIG. 12, and drive unit 40 is vibrated in step S505 after processing completes steps S503 and S504.

More specifically, in step S502, when the value of pressure P is lower than pressure threshold Pt (YES), the press input is determined to have transitioned from an ON state to an OFF state, and processing subsequently performs steps S503 through S505. However, when the value of pressure P is greater than pressure threshold Pt (NO), the press input made on input panel 72 is determined to not have transitioned from an ON state to an OFF state, and the sequence of processing operations is ended without driving drive unit 40.

Embodiment 4

In Embodiment 4, a display example will be described in which display screen 2a including cursor 3 displayed on display device 2, which is an example of an external device, in response to an input made on input device 1.

Figure 15:
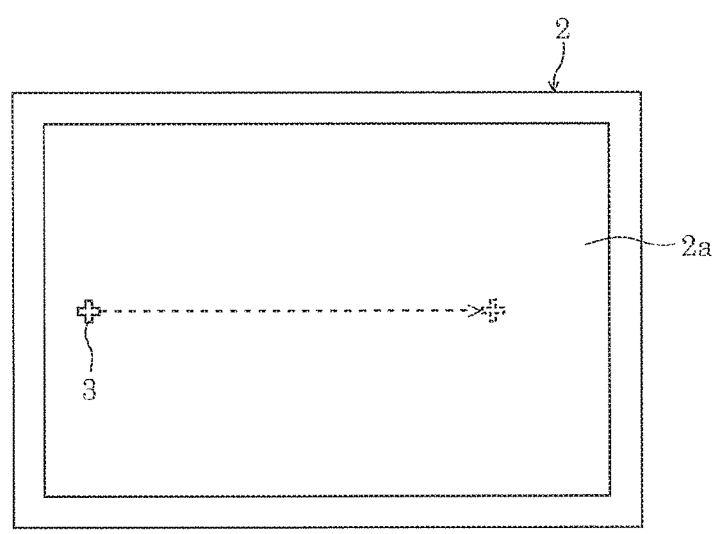
FIG. 15 is a front view schematically illustrating a display device and the distance of travel of a cursor displayed on a display screen.
Figure 17:
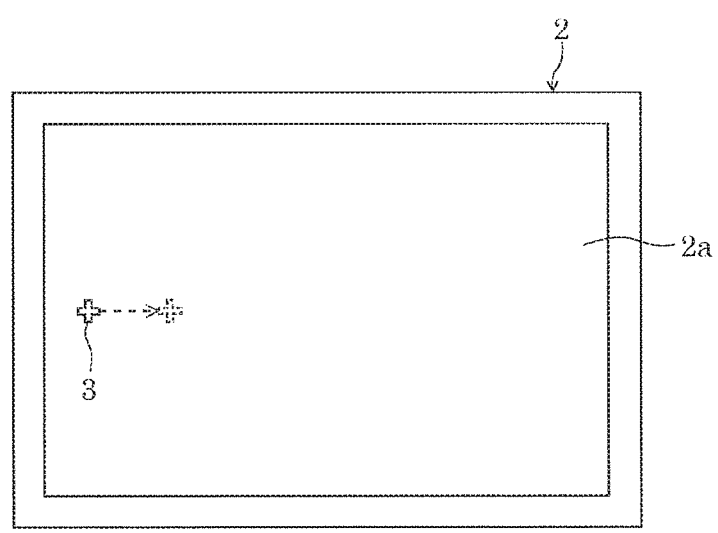
FIG. 17 corresponds to FIG. 15, and schematically illustrates the distance of travel of the cursor that corresponds to the magnitude of the contact area illustrated in FIG. 16.

As illustrated in FIG. 15 and FIG. 17, display device 2 includes display screen 2a and cursor 3 movably displayed on display screen 2a. The distance and direction in which cursor 3 moves are determined based on an operation value (to be described later).

Figure 13:
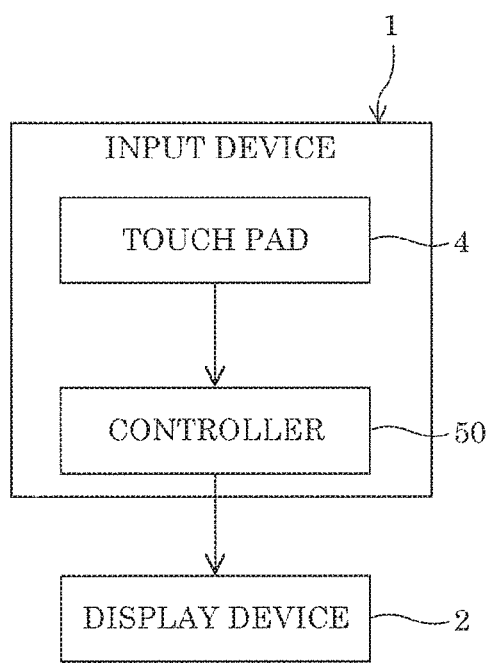
FIG. 13 is a block diagram illustrating the functional configuration of the input device according to Embodiment 4.

As illustrated in FIG. 1 and FIG. 13, input device 1 includes touch pad 4. Touch pad 4 is configured as, for example, an electrostatic capacitive sensor, and includes touch sensor 73 and touch controller 74 according to Embodiment 1.

Figure 14:
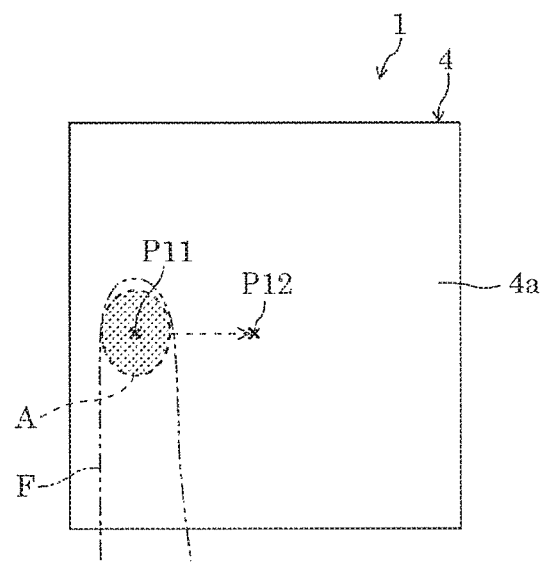
FIG. 14 is a plan view of an input device on which the contact area between the input surface of a touch pad and an object is schematically illustrated.
Figure 16:
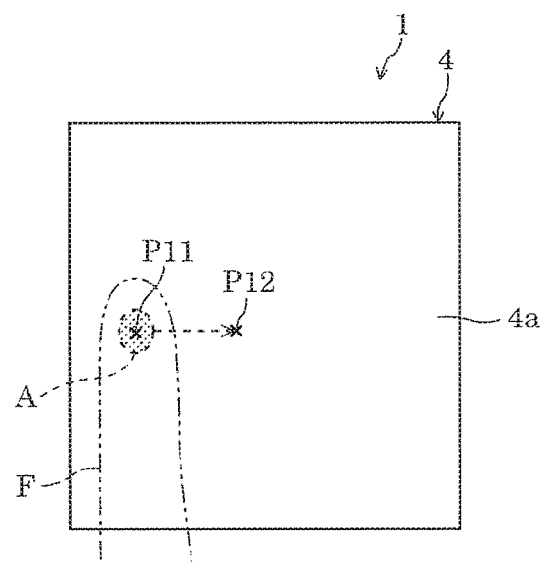
FIG. 16 corresponds to FIG. 14, and shows an example in which the contact area is smaller than in FIG. 14.

As illustrated in FIG. 14 and FIG. 16, touch pad 4 includes input surface 4a formed on the top surface of touch pad 4. Note that input surface 4a corresponds to input surface 72a described in Embodiment 1. A touch input can be made on input device 1 by the user touching input surface 4a with object F. As illustrated in FIG. 15 and FIG. 17, it is possible to move cursor 3 displayed on display screen 2a of display device 2 to a given position with a touch input. Examples of object F include the hand or finger of the user or a flexible stylus.

As illustrated in FIG. 13, input device 1 includes controller 50. Controller 50 is electrically connected to display device 2 and touch pad 4. For example, a settings table for determining transfer coefficients (to be described later) and information on previously determined transfer coefficients in the processing operations illustrated in FIG. 18 (to be described later) are stored in controller 50.

Controller 50 is capable of detecting a contact quantity related to contact between touch pad 4 and object F. A contact quantity is, for example, contact area A between touch pad 4 and object F (see FIG. 14 and FIG. 16), detected by controller 50. Note that in FIG. 14 and FIG. 16, in order to accentuate contact area A, contact area A is shaded by dot hatching.

Controller 50 is also capable of detecting a coordinate change quantity indicating an amount of movement of object F on input surface 4a of touch pad 4 resulting from a touch input. More specifically, controller 50 detects the coordinates of start point P11 at time T1 when object F touches input surface 4a of touch pad 4 and end point P12 at time T2 when object F is removed from input surface 4a (see FIG. 14 and FIG. 16), and calculates a coordinate change quantity from the beginning to the end of the move made by object F based on the coordinates of start point P11 and end point P12.

Controller 50 then calculates an operation value for operating display device 2, based on the magnitude of contact area A (i.e., the contact quantity) and the coordinate change quantity, and outputs the calculated operation value to display device 2. A specific example of how this operation value is calculated will be given later (see FIG. 18). Note that controller 50 may output coordinates on touch pad 4 rather than the operation value.

Moreover, in this embodiment, controller 50 decreases the operation value as contact area A decreases. More specifically, as illustrated in FIG. 14, when contact area A is relatively large, the operation value calculated by controller 50 is large. As a result, as illustrated in FIG. 15, the distance of travel of cursor 3 displayed on display screen 2a of display device 2 increases. However, as illustrated in FIG. 16, when contact area A is relatively small, that is to say, when smaller than contact area A illustrated in FIG. 14, the operation value calculated by controller 50 is small. As a result, as illustrated in FIG. 17, the distance of travel of cursor 3 decreases.

Next, a sequence of processing operations performed by controller 50 will be described with reference to FIG. 18.

Figure 18:
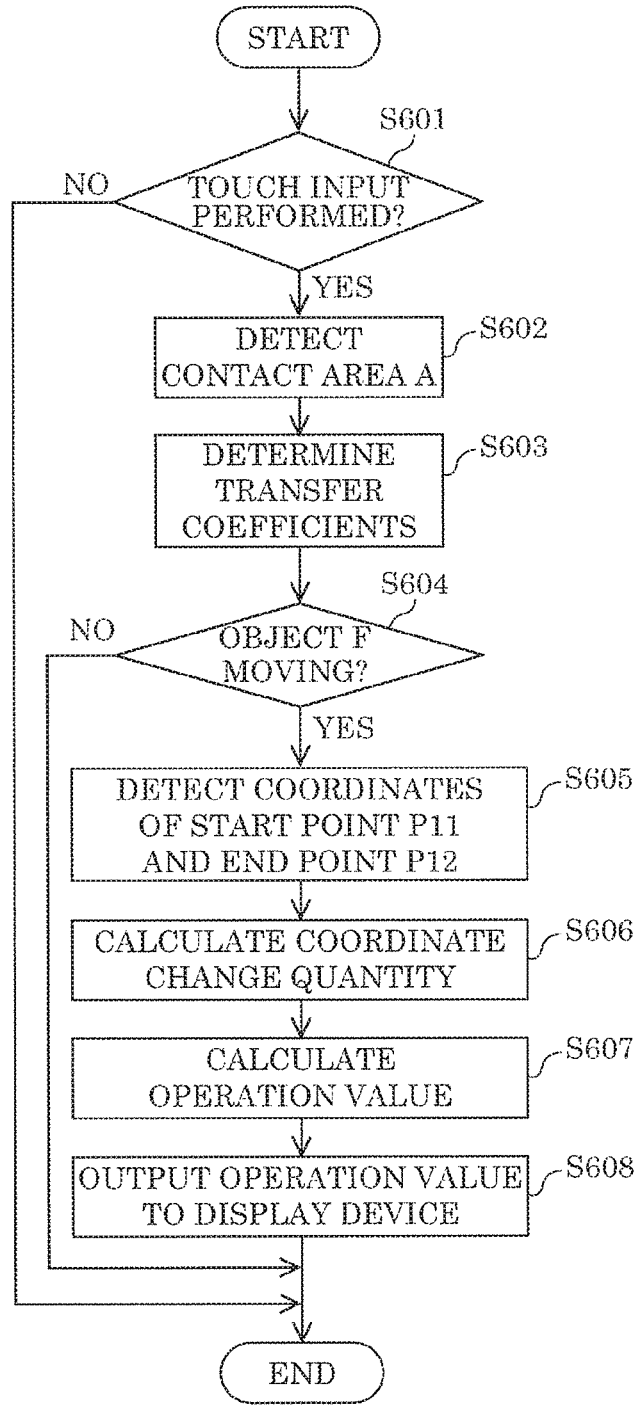
FIG. 18 is a flow chart illustrating processing operations performed by the controller according to Embodiment 4.

As illustrated in FIG. 18, in the first step S601, controller 50 detects whether object F is touching input surface 4a of touch pad 4 or not, that is to say, detects whether a touch input has been made or not. If a touch input has been made (YES), processing proceeds to step S602. If a touch input has not been made (NO), the sequence of processing operation ends.

Next, in step S602, controller 50 detects contact area A between object F and touch pad 4 during the touch input. Processing then proceeds to step S603.

In stop S603, controller 50 determines the transfer coefficients for deriving the operation value from the settings table stored in advance based on the magnitude of contact area A detected in step S602. Processing then proceeds to step S604. Note that the settings table may be changeable depending on, for example, the physique or preferences of the user, or whether the user is wearing gloves or not. Moreover, the settings table may be learn the usage styles of the user and automatically update based on the learned information.

In step S604, controller 50 detects whether object F has moved on input surface 4a of touch pad 4 or not. If object F has moved (YES), processing proceeds to step S605. If object F has not moved (NO), the sequence of processing operations ends.

In step S605, controller 50 detects coordinates corresponding to start point P11 and end point P12 of the touch input on input surface 4a. Processing then proceeds to step S606.

In step S606, controller 50 calculates a coordinate change quantity from the beginning to the end of the movement of object F based on the coordinates of start point P11 and end point P12 detected in step S605. Processing then proceeds to step S607.

In step S607, controller 50 calculates an operation value for operating cursor 3 of display device 2 from the mathematical product of transfer coefficients determined in step S603 and the coordinate change quantity detected in step S606. Processing then proceeds to step S608.

In step S608, controller 50 outputs the operation value calculated in step S607 to display device 2. With this, cursor 3 of display device 2 moves on display screen 2a of display device 2 in accordance with the distance and direction of travel corresponding to the operation value.

This completes the sequence of processing operations performed by controller 50.

Here, the processing operations illustrated in FIG. 18 are repeatedly performed via a main routine (not illustrated in the drawings) executed by controller 50. In other words, controller 50 changes the operation value in accordance with the increases and decreases in contact area A while there is continuous contact between touch pad 4 and object F.

(Advantageous Effects Achieved by Embodiment 4)

As described above, controller 50 calculates an operation value for operating an external device based on a contact quantity and a coordinate change quantity. More specifically, in input device 1 according to Embodiment 4, controller 50 calculates an operation value for operating display device 2 (i.e., an external device) based on the magnitude of contact area A (i.e., contact quantity) and a coordinate change quantity. The distance of travel of cursor 3 is defined by the operation value output from controller 50 to display device 2. Accordingly, the distance of travel of cursor 3 can be appropriately changed according to the size of display screen 2a of display device 2 simply with an intuitive input (i.e., touch input) while adjusting the magnitude of contact area A. Moreover, by adjusting the magnitude of contact area A, regardless of the size of display screen 2a, it is possible to move cursor 3 to a desired location with a single touch input. Stated differently, continuous travel of cursor 3 can be completed by performing a touch input on input surface 4a of touch pad 4. This eliminates the need to perform such conventional techniques as performing multiple touch inputs to move cursor 3 to a desired location and removes the burden of having to perform inputs other than a touch input. Accordingly, with input device 1 according to Embodiment 4, it is possible to operate an external device with a simple configuration simply by performing an intuitive input, and it is possible to make how it feels to operate input device 1 consistent.

Moreover, controller 50 decreases the operation value as contact area A decreases. Stated differently, the travel distance of cursor 3 is set to change in accordance with increases and decreases in contact area A. Accordingly, with input device 1, it is possible to adjust the distance of travel of cursor 3 with an intuitive input.

Moreover, controller 50 changes the operation value in accordance with the increases and decreases in contact area A while there is continuous contact between touch pad 4 and object F. Stated differently, even while contact between touch pad 4 and object F is ongoing, the travel distance of cursor 3 is set to change in accordance with increases and decreases in contact area A. Accordingly, with input device 1, it is possible to adjust the distance of travel of cursor 3 in real time with an intuitive input, even while there is continuous contact between touch pad 4 and object F.

Variation 1 of Embodiment 4

In Embodiment 4, controller 50 decreases the operation value as contact area A decreases, but this is merely one, non-limiting example. In Variation 1 of Embodiment 4, controller 50 may decrease the operation value as contact area A increases. With Variation 1 as well, it is possible to adjust the distance of travel of cursor 3 with an intuitive input, since the distance of travel of cursor 3 changes in accordance with increases and decreases in contact area A.

Variation 2 of Embodiment 4

In Embodiment 4, controller 50 changes the operation value in accordance with the increases and decreases in contact area A while there is continuous contact between touch pad 4 and object F, but this is merely one, non-limiting example. In Variation 2 of Embodiment 4, when object F is moving, controller 50 may determine the operation value based on contact area A at initial contact between object F and touch pad 4 and the coordinate change quantity, and continuously output the determined operation value to display device 2 until object F is removed from touch pad 4. With Variation 2 of Embodiment 4, it is possible to make the distance of travel of cursor 3 constant based on contact area A at initial contact between touch pad 4 and object F.

Variation 3 of Embodiment 4

In Embodiment 4, the user is described as changing the magnitude of contact area A using only one finger (see FIG. 14 and FIG. 16), but this is merely one, non-limiting example; the user may change the total value of contact area A, A, . . . , made with two or more fingers. Variation 3 configured in such a manner is capable of achieving the same advantageous effects as Embodiment 4.

Embodiment 5

Figure 19:
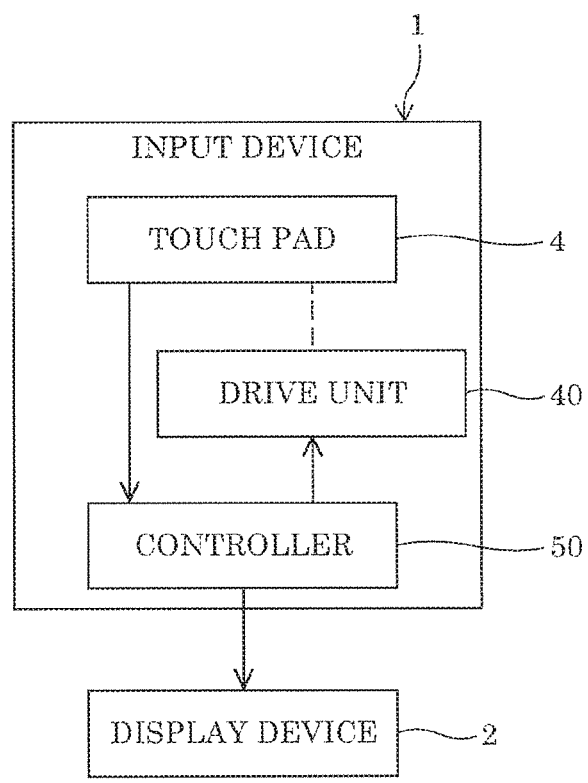
FIG. 19 is a block diagram illustrating the functional configuration of the input device according to Embodiment 5.
Figure 20:
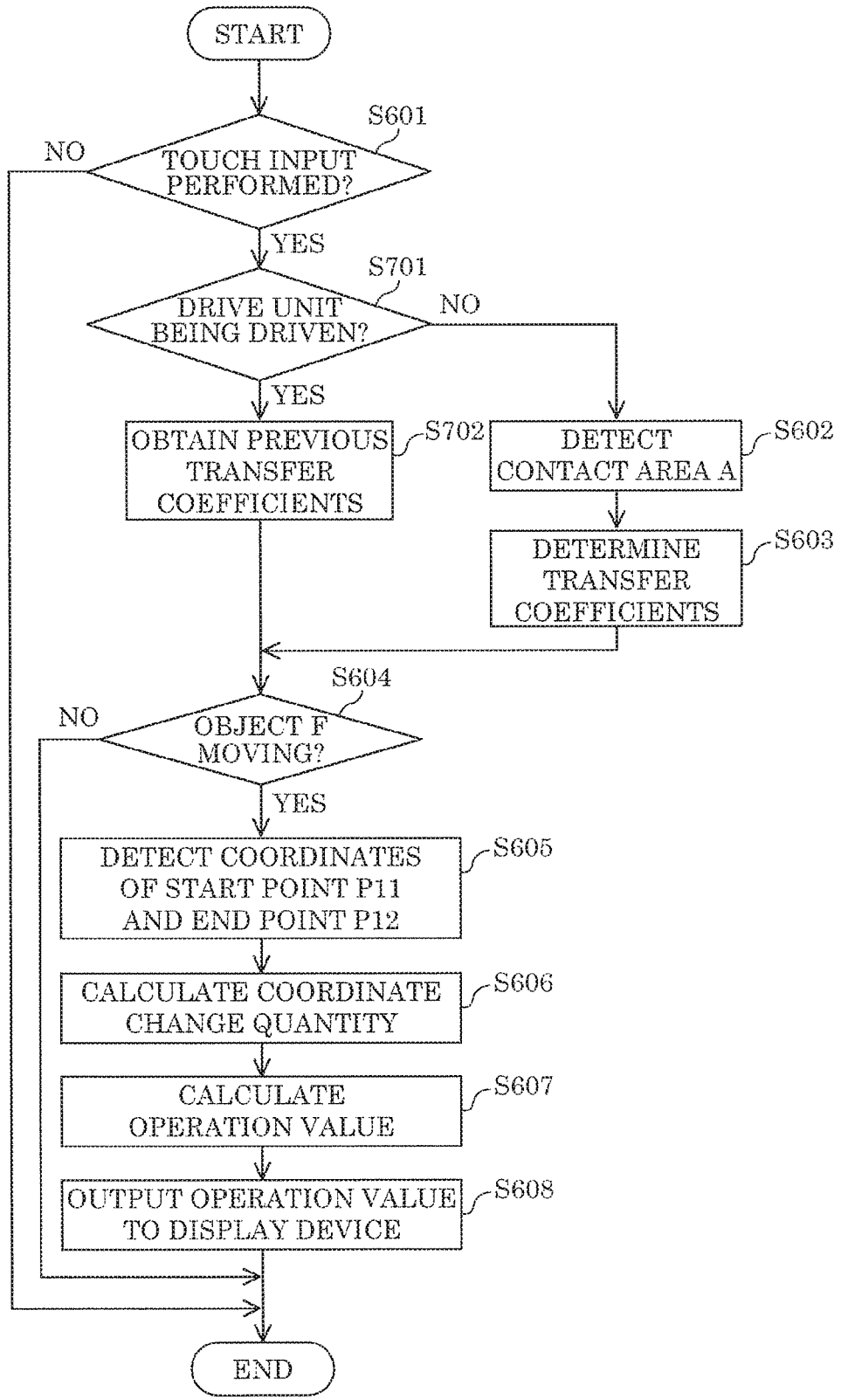
FIG. 20 is a flow chart illustrating processing operations performed by the controller according to Embodiment 5.

FIG. 19 and FIG. 20 illustrate input device 1 according to Embodiment 5. Embodiment 5 differs from Embodiment 4 in that Embodiment 5 additionally includes a configuration for vibrating touch pad 4. The configuration for vibrating touch pad 4 is the same as the configuration described in Embodiments 1 through 3. Note that other configurations in input device 1 according to Embodiment 5 are the same as input device 1 according to Embodiment 4. Accordingly, in the following described, the same reference signs as those in FIG. 13 through FIG. 18 are used, and duplicate detailed description thereof will be omitted.

Just like in Embodiment 1, input device 1 according to Embodiment 5 includes drive unit 40 electrically connected to controller 50. Drive unit 40 is for providing haptic feedback to object F touching input surface 4a of touch pad 4 by, for example, horizontally vibrating touch pad 4. More specifically, drive unit 40 is, for example, a piezoelectric body, and is mechanically coupled to touch pad 4.

One characteristic of Embodiment 5 is that controller 50 prohibits changing of the operation value to prevent the operation value from varying from increases and decreases in contact area A while drive unit 40 is being driven. The sequence of processing operations pertaining to the above performed by controller 50 will be described in detail with reference to FIG. 20. Note that detailed description of processing operations that are the same as in FIG. 18 described above in Embodiment 1 will be omitted.

As illustrated in FIG. 20, in the first step S601, whether or not a touch input has been made is detected, and if a touch input has been made (YES), processing proceeds to S701.

In step S701, controller 50 detects whether drive unit 40 is being driven or not. If drive unit 40 is being driven (YES), processing proceeds to step S702. If drive unit 40 is not being driven (NO), processing proceeds to step S602.

In step S702, controller 50 obtains the transfer coefficients determined in a previous processing operation from a storage area inside controller 50. Processing then proceeds to step S604. Processing operations from step S604 on are the same as described above in Embodiment 4.

(Advantageous Effects Achieved by Embodiment 5)

As described above, controller 50 prohibits changing of the operation value to prevent the operation value from varying from increases and decreases in contact area A while drive unit 40 is being driven. Stated differently, with input device 1 according to Embodiment 5, even if contact area A increases and decreases while drive unit 40 is being driven, the distance of travel of cursor 3 is set so as not to vary in display device 2. Accordingly, when haptic feedback is provided to object F, such as a finger, even if the vibration of touch pad 4 unintentionally changes contact area A, the travel velocity of cursor 3 can be kept constant. Accordingly, with input device 1 according to Embodiment 5, it is possible to stably perform an input for moving cursor 3.

Variation 1 of Embodiment 5

In Variation 1 of Embodiment 5, controller 50 may prohibit changing of the operation value so as to prevent the operation value from varying both during a first deactivation period before drive unit 40 is driven and a second deactivation period after driving of drive unit 40 is completed. This makes it possible to even more stably perform an input for moving cursor 3.

Variation 2 of Embodiment 5

Taking into account the fact that haptic feedback is more perceptible via object F during an initial vibration initiated by driving drive unit 40 compared to a second vibration initiated by driving drive unit 40 shortly after the initial vibration, the first deactivation period may be set shorter than the second deactivation period. This makes it possible to stably perform an input for moving cursor 3 even before drive unit 40 is driven.

Variation 3 of Embodiment 5

Furthermore, controller 50 may determine the operation value before drive unit 40 is driven and continuously output the determined operation value to display device 2 until object F is removed from touch pad 4. With this, the travel velocity of cursor 3 determined before drive unit 40 is driven is maintained. This makes it possible to stably perform an input for moving cursor 3 from the start of the touch input to the end of the touch input.

Other Embodiments

In the above description, an example in which input component 70 is pressed by a finger of the user is given, but instead of a finger of the user, but input component 70 may be pressed by an object such as a stylus.

Moreover, in the above description, input device 1 according to Embodiment 1 is exemplified as operating in response to receipt of a press input, and input device 1 according to Embodiment 2 is exemplified as operating in response to receipt of a release input, but input device 1 may be configured to operate in response to both inputs of a press input and a release input.

Moreover, in the above description, drive signal S is described as a sine wave, but drive signal S is not limited to a sine wave. For example, drive signal S may have an oscillatory waveform that provides haptic feedback to the finger of the user that mimics the feeling of a mechanical switch being pressed when a press input is made.

Moreover, in the above description, drive unit 40 is exemplified as being configured to vibrate input component 70 in response to control by drive controller 51, but drive unit 40 may be configured to perform other operations (e.g., causing a light-emitting device to emit light) in response to control by drive controller 51.

Moreover, in the above description, input device 1 is exemplified as being used to operate a vehicle on-board device, but input device 1 is not limited to this example. For example, input device 1 may be used to operate some other device (such as a gaming device).

With input device 1 according to Embodiments 3 and 4, controller 50 calculates pressure P by dividing load N by contact area A and compares pressure P with a predetermined pressure threshold Pt to determine whether or not a press input has been made, but this is merely one, non-limiting example. For example, input device 1 may be configured to calculate an inverse reciprocal of pressure P by dividing contact area A by load N, and comparing the inverse reciprocal of pressure P with pressure threshold Pt to determine whether a press input has been made. In other words, it is sufficient if controller 50 in input device 1 can determine whether or not a press input has been made based on contact area A and load N.

Moreover, with input device 1 according to Embodiment 1 through 3, pressure-sensitive sensor 30 is exemplified as, but not limited to, being implemented as an electrostatic capacitive sensor. For example, pressure-sensitive sensor 30 may be configured as an optical sensor, piezoelectric sensor, or a conductive rubber sensor. Alternatively, pressure-sensitive sensor 30 may be configured as a pressure switch. This reduces the cost of pressure-sensitive sensor 30. Further, when pressure-sensitive sensor 30 is configured as a pressure switch, pressure-sensitive sensor 30 may include a metal dome. This makes it possible to achieve a sense of operating pressure-sensitive sensor 30.

Moreover, input device 1 according to Embodiments 1 through 5 may include a display (not illustrated in the drawings) on input surface 72a of touch sensor 73.

Moreover, in Embodiments 1 through 3 and 5, each elastic component 82 is exemplified as, but not limited to, being made of rubber. For example, elastic components 82 may be implemented as springs.

In Embodiments 1 through 5, input device 1 is exemplified as, but not limited to, being implemented in an automobile (see FIG. 1). For example, input device 1 may be implemented in a variety of devices equipped with a display device (for example, a personal computer, a mobile phone, a mobile information terminal, a mobile game device, a photocopier, a ticket vending machine, or an automatic teller machine).

Moreover, in Embodiments 1 through 5, input device 1 is exemplified as, but not limited to, being arranged in the center console in the interior of an automobile (see FIG. 1). For example, input device 1 may be arranged in any suitable location in the interior of the automobile. For example, input device 1 may be arranged on the spoke of the steering wheel.

Moreover, in Embodiments 4 and 5, the contact quantity is exemplified as, but not limited to, the magnitude of contact area A between touch pad 4 and object F. For example, the contact quantity may be the number of contacts between object(s) F, such as a finger or fingers, and touch pad 4. In such cases, controller 50 may detect the number of contacts and calculate the operation value based on the number of contacts. This makes it possible to easily change the distance of travel of cursor 3 based on, for example, the number of fingers contacting input surface 4a of touch pad 4, regardless of the magnitude of contact area A.

Moreover, the above embodiments and variations thereof may be combined. For example, Embodiments 1 through 3 may be combined to achieve an input device 1 configured to change the pressure threshold in accordance with the rate of change in load applied to touch sensor 73 as detected by pressure-sensitive sensor 30. Moreover, for example, Embodiments 1 through 3 and Embodiment 5 may be combined to achieve an input device 1 configured to change the pressure threshold in accordance with the rate of change in the load applied to touch pad 4 as detected by pressure-sensitive sensor 30 and calculate an operation value for operating an external device (display device 2) based on the contact quantity and the coordinate change quantity. Furthermore, a configuration in which input device 1 includes only one of Embodiments 1 through 5 is acceptable. Moreover, input device 1 may include a plurality of Embodiments 1 through 5 as independent configurations. In other words, for example, touch sensor 73 according to Embodiments 1 through 3, touch pad 4 according to Embodiments 4 and 5 may be included in input device 1 as independent configurations. The embodiments and variations thereof described above merely provide what are essentially preferred examples, and do not intend to limit application of the present disclosure or the scope of the application of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by references on their entirety: Japanese Patent Application No. 2018-007322 filed on Jan. 19, 2018, Japanese Patent Application No. 2018-019392 filed on Feb. 6, 2018, Japanese Patent Application No. 2018-035903 filed on Feb. 28, 2018, and Japanese Patent Application No. 2018-179072 filed on Sep. 25, 2018.

INDUSTRIAL APPLICABILITY

As described above, the present disclosure is applicable as an input device.

What is claimed is:
1. An input device, comprising:
a main body including an input component that receives a load by being pressed;
a pressure-sensitive sensor that detects the load received by the input component;
a drive unit configured to perform a predetermined operation; and
a controller including a drive controller and a detection controller, the drive controller activating the drive unit when the load detected by the pressure-sensitive sensor reaches a predetermined load threshold, and the detection controller changing the predetermined load thresh- old in accordance with a rate of change in the load detected by the pressure-sensitive sensor, wherein:

the drive unit is configured to vibrate the input component in response to control by the drive controller, the predetermined load threshold is one of (i) a predetermined press threshold for a press input defined by a gradual increase in the load received by the input component and (ii) a predetermined release threshold for a release input defined by a gradual decrease in the load received by the input component, the drive controller activates the drive unit when one of (i) the load detected by the pressure-sensitive sensor during the press input gradually increases and reaches the predetermined press threshold and (ii) the load detected by the pressure-sensitive sensor during the release input gradually decreases and reaches the predetermined release threshold, and the detection controller one of (i) changes the predetermined press threshold in accordance with the rate of change in the load detected by the pressure-sensitive sensor during the press input, the rate of change during the press input being a press velocity, and (ii) changes the predetermined release threshold in accordance with the rate of change in the load detected by the pressure-sensitive sensor during the release input, the rate of change during the release input being a release velocity.

2. The input device according to claim 1, wherein the detection controller one of (i) sets the predetermined press threshold to a first press threshold when the press velocity does not exceed a predetermined press velocity threshold during the press input, and sets the predetermined press threshold to a second press threshold lower than the first press threshold when the press velocity exceeds the predetermined press velocity threshold during the press input, and (ii) sets the predetermined release threshold to a first release threshold when the release velocity does not exceed a predetermined release velocity threshold during the release input, and sets the predetermined release threshold to a second release threshold higher than the first release threshold when the release velocity exceeds the predetermined release velocity threshold during the release input.

3. The input device according to claim 2, wherein the predetermined press velocity threshold is set based on a plurality of press velocities, each being the press velocity, obtained by a user performing the press input a plurality of times, and the predetermined release velocity threshold is set based on a plurality of release velocities, each being the release velocity, obtained by the user performing the release input a plurality of times.

4. The input device according to claim 1, wherein the drive controller changes, in accordance with the press velocity, at least one of an amplitude, a frequency, and a duration of a vibration applied to the input component by the drive unit.

5. The input device according to claim 1, wherein the input component moves in a direction in which the load is applied, in accordance with an increase in the load, the main body includes a stopper that contacts the input component to restrict movement of the input component in the direction, when the load detected by the pressure-sensitive sensor during the press input reaches a predetermined maximum load, the drive controller changes, among an amplitude, a frequency, and a duration of a vibration applied to the input component by the drive unit, at least the amplitude, and the predetermined maximum load is set to a value greater than a value of the load at contact between the input component and the stopper during the press input.

6. The input device according to claim 1, wherein when the press input is repeated two or more times consecutively, the detection controller sets the predetermined press threshold for second and subsequent instances of the press input lower than the predetermined press threshold set for a first instance of the press input.

7. The input device according to claim 1, wherein the drive controller changes, in accordance with the release velocity, at least one of an amplitude, a frequency, and a duration of a vibration applied to the input component by the drive unit.

8. An input device, comprising:

a main body including an input component that receives a load by being pressed;

a pressure-sensitive sensor that detects the load received by the input component;

a drive unit configured to perform a predetermined operation;

a controller including a drive controller and a detection controller, the drive controller activating the drive unit when the load detected by the pressure-sensitive sensor reaches a predetermined load threshold, and the detection controller changing the predetermined load threshold in accordance with a rate of change in the load detected by the pressure-sensitive sensor; and an electrostatic capacitive touch sensor configured to detect a surface area of contact with at least an object used to perform an input, wherein:

the controller:
  calculates pressure applied to the electrostatic capacitive touch sensor by dividing the load output from the pressure-sensitive sensor by the surface area output from the electrostatic capacitive touch sensor;
  determines a load state, including whether a press input is being performed or not, of the electrostatic capacitive touch sensor by comparing the pressure with a predetermined pressure threshold;
  provides haptic feedback to the object according to the load state;
  calculates a vibration strength for the drive unit based on the surface area;
  includes storage that stores a reference vibration strength for the drive unit and a plurality of coefficients corresponding to different magnitudes of the surface area; and
  calculates the vibration strength for the surface area output by the electrostatic capacitive touch sensor based on a mathematical product of the reference vibration strength and a coefficient in the plurality of coefficients that corresponds to the surface area output by the electrostatic capacitive touch sensor, and the drive unit is configured to generate the haptic feedback to be applied to the object by vibrating the electrostatic capacitive touch sensor.

9. The input device according to claim 8, wherein the controller calculates the vibration strength to increase with an increase in the surface area.

10. The input device according to claim 8, wherein the controller is configured to arbitrarily set the reference vibration strength.

11. An input device comprising:
a main body including an input component that receives a load by being pressed;
a pressure-sensitive sensor that detects the load received by the input component;
a drive unit configured to perform a predetermined operation;
a controller including a drive controller and a detection controller, the drive controller activating the drive unit when the load detected by the pressure-sensitive sensor reaches a predetermined load threshold, and the detection controller changing the predetermined load threshold in accordance with a rate of change in the load detected by the pressure-sensitive sensor;
a touch pad including an input surface, the touch pad being configured to receive a touch input via contact between the input surface and an object; and
a display that displays a display screen including a cursor that is movable,
wherein the controller:
    calculates a distance of travel of the cursor on the display screen based on one of (i) a magnitude of a surface area of contact between the touch pad and the object and a coordinate change quantity indicating an amount of movement of the object on the input surface of the touch pad resulting from the touch input based on a detection value from the touch pad, and (ii) a total number of contacts between the touch pad and the object and a coordinate change quantity indicating an amount of movement of the object on the input surface of the touch pad resulting from the touch input based on a detection value from the touch pad, and
    outputs the distance of travel of the cursor to the display device.

12. The input device according to claim 11, wherein the controller one of:
    (i) reduces the distance of travel of the cursor as the surface area increases;
    (ii) reduces the distance of travel of the cursor as the surface area decreases;
    (iii) changes the distance of travel of the cursor in accordance with increases and decreases in the surface area while there is continuous contact between the touch pad and the object; and
    (iv) when the object is moving, determines the distance of travel of the cursor based on the coordinate change quantity and the surface area at initial contact between the object and the touch pad, and continuously outputs the distance of travel of the cursor determined to the external device until the object is removed from the touch pad.

13. The input device according to claim 11, wherein the drive unit is electrically connected to the controller and configured to vibrate the touch pad when mechanically coupled to the touch pad, and
while the drive unit is being driven, the controller prohibits changing of the distance of travel of the cursor to prevent the distance of travel of the cursor from varying from increases and decreases in the surface area.

* * * * *